(12) United States Patent
Zhang et al.

(10) Patent No.: US 9,926,398 B2
(45) Date of Patent: Mar. 27, 2018

(54) COMPOSITE PARTICLES AND A PROCESS FOR MAKING THE SAME

(71) Applicant: Cabot Corporation, Boston, MA (US)

(72) Inventors: Qingling Zhang, Bloomfield Hills, MI (US); Bennett Greenwood, Somerville, MA (US); Ravi Sharma, Acton, MA (US); Geoffrey D. Moeser, Groton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/771,263

(22) PCT Filed: Mar. 18, 2014

(86) PCT No.: PCT/US2014/031078
§ 371 (c)(1),
(2) Date: Aug. 28, 2015

(87) PCT Pub. No.: WO2014/153355
PCT Pub. Date: Sep. 25, 2014

(65) Prior Publication Data
US 2016/0009844 A1    Jan. 14, 2016

Related U.S. Application Data

(60) Provisional application No. 61/803,613, filed on Mar. 20, 2013, provisional application No. 61/819,229, (Continued)

(51) Int. Cl.
*C08F 283/00* (2006.01)
*C08K 9/06* (2006.01)
(Continued)

(52) U.S. Cl.
CPC ............ *C08F 283/004* (2013.01); *C08K 3/22* (2013.01); *C08K 9/06* (2013.01); *C09D 151/08* (2013.01); *C09J 151/08* (2013.01); *G03G 9/08* (2013.01)

(58) Field of Classification Search
None
See application file for complete search history.

(56) References Cited

U.S. PATENT DOCUMENTS 3,544,500 A    12/1970  Osmond et al.
4,421,660 A    12/1983  Solc nee Hajna
(Continued)

FOREIGN PATENT DOCUMENTS

EP    0104498 A2    4/1984
EP    0505230 A1    9/1992
(Continued)

OTHER PUBLICATIONS

Wen et al. "Organic-inorganic hybrid superhydrophobic surfaces using methyltriethoxysilane and tetraethoxysilane sol-gel derived materials in emulsion" Applied Surface Science 258, 2011, 991-998.*

(Continued)

*Primary Examiner* — Robert S Loewe

(57) ABSTRACT

The invention provides composite particles comprising core particles having organosilica particles disposed about the core particles. The invention also provides a process for making the composite particles.

19 Claims, 32 Drawing Sheets

Related U.S. Application Data filed on May 3, 2013, provisional application No. 61/919,215, filed on Dec. 20, 2013.

(51) Int. Cl.
  *C08K 3/22* (2006.01)
  *C09D 151/08* (2006.01)
  *C09J 151/08* (2006.01)
  *G03G 9/08* (2006.01)

(56) References Cited

U.S. PATENT DOCUMENTS

| | | |
|---|---|---|
| 4,608,401 A | 8/1986 | Martin |
| 4,981,882 A | 1/1991 | Smith et al. |
| 5,223,365 A * | 6/1993 | Yamamoto ............ G03G 9/0827 430/106.1 |
| 6,541,114 B2 * | 4/2003 | Katou ................... C08F 265/06 428/403 |
| 6,756,437 B1 | 6/2004 | Xue et al. |
| 6,833,401 B1 | 12/2004 | Xue et al. |
| 7,094,830 B2 | 8/2006 | Xue et al. |
| 8,703,374 B2 | 4/2014 | Sweeney et al. |
| 8,846,285 B2 | 9/2014 | Chiba et al. |
| 8,871,844 B2 | 10/2014 | Hashemzadeh |
| 2002/0142242 A1 * | 10/2002 | Inoue ................... G03G 9/0827 430/110.3 |
| 2002/0182525 A1 * | 12/2002 | Hayashi ............... G03G 9/0838 430/108.3 |
| 2007/0075291 A1 | 4/2007 | Paik et al. |
| 2007/0160925 A1 * | 7/2007 | Koido .................. G03G 9/0819 430/108.7 |
| 2007/0189944 A1 * | 8/2007 | Kirkland ............ B01J 20/28004 423/118.1 |
| 2010/0213131 A1 * | 8/2010 | Linford .................... B01J 13/02 210/656 |
| 2010/0330132 A1 * | 12/2010 | Inokuchi ................. A61K 8/02 424/401 |
| 2011/0015340 A1 * | 1/2011 | Hashemzadeh ............ C08J 3/14 524/588 |
| 2011/0021666 A1 * | 1/2011 | Nishi ....................... C01B 33/12 523/443 |
| 2011/0236812 A1 * | 9/2011 | Ishihara ............... G03G 9/0819 430/105 |
| 2011/0287247 A1 | 11/2011 | Kawasaki et al. |
| 2011/0318584 A1 * | 12/2011 | Yoshikawa ............ C07F 7/0863 428/404 |
| 2012/0058425 A1 * | 3/2012 | Shu ...................... G03G 9/0804 430/105 |
| 2013/0101934 A1 * | 4/2013 | Chiba .................. G03G 9/0819 430/108.7 |
| 2013/0137029 A1 * | 5/2013 | Kadonome .............. G03G 9/08 430/105 |
| 2013/0316281 A1 * | 11/2013 | Cheng .................... G03G 9/093 430/110.2 |
| 2014/0051250 A1 | 2/2014 | Minami et al. |
| 2014/0113226 A1 | 4/2014 | Ishii et al. |

FOREIGN PATENT DOCUMENTS

| | | |
|---|---|---|
| EP | 0572128 B1 | 7/1998 |
| EP | 1138733 A2 | 10/2001 |
| EP | 2386590 A1 | 11/2011 |
| GB | 2227739 A | 8/1990 |
| JP | 1993/214054 A | 8/1993 |
| JP | 1993/239340 A | 9/1993 |
| JP | 1993/239341 A | 9/1993 |
| JP | 1994/211961 A | 8/1994 |
| JP | 2008-291252 | 12/2008 |
| KR | 10-2010-0075235 | 7/2010 |
| WO | WO 2013/063291 A1 | 5/2013 |

OTHER PUBLICATIONS

Notification of Transmittal of International Preliminary Report on Patentability (Chapter I of the Patent Cooperation Treaty) of International Patent Application No. PCT/US2014/031078, dated Oct. 1, 2015.

Notification of Transmittal of The International Search Report and The Written Opinion of The International Searching Authority, or the Declaration of International Patent Application No. PCT/US2014/031078, dated Aug. 6, 2014.

Vogel, N., et al., "Platinum Nanoparticles from Size Adjusted Functional Colloidal Particles Generated by a Seeded Emulsion Polymerization Process", Beilstein Journal of Nanotechnology, 2011, vol. 2, pp. 459-472.

Fukuri, N., et al., "Control of the Morphology of Dispersed Crystalline Polyester in a Toner for Low-Energy Fusing", Journal of Imaging Science and Technology, 2011, vol. 55(1), pp. 010509-010509-8.

Chung, K., et al., "Preparation of Copoly(styrene/butyl methacrylate) Beads and Composite Particles Containing Carbon Black with Hydrophobic Silica as a Stabilizer in Aqueous Solution", Elastomers and Composites, 2012, vol. 47(1), pp. 43-53.

* cited by examiner 100 nm

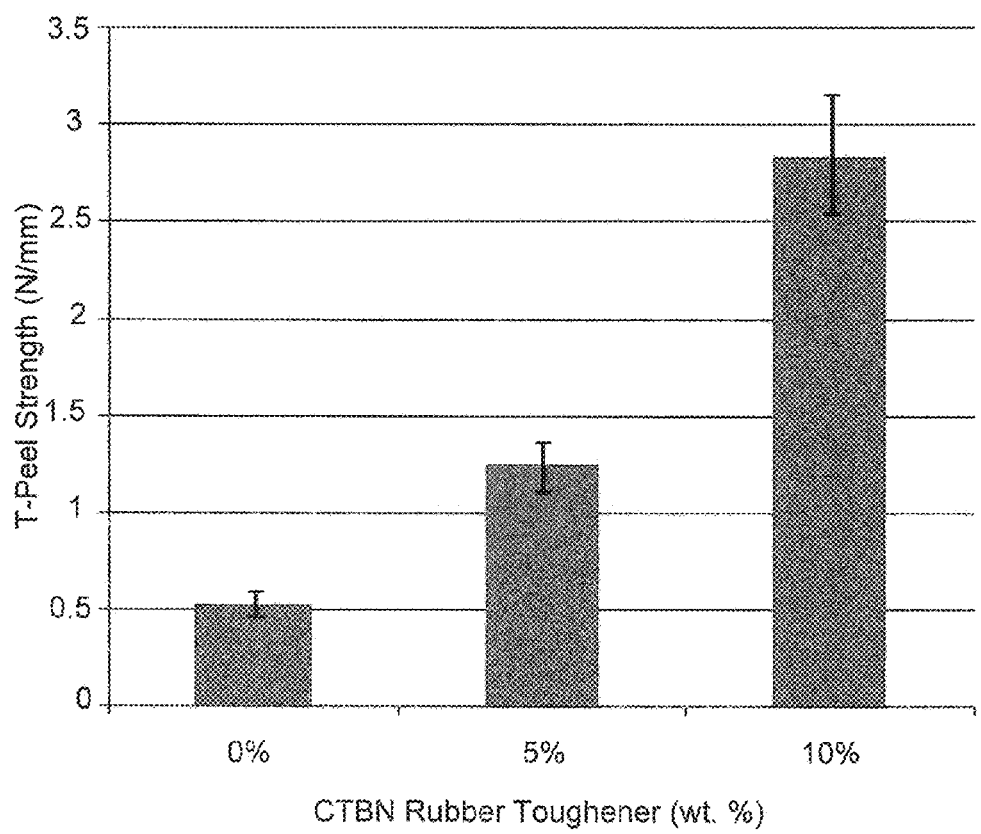

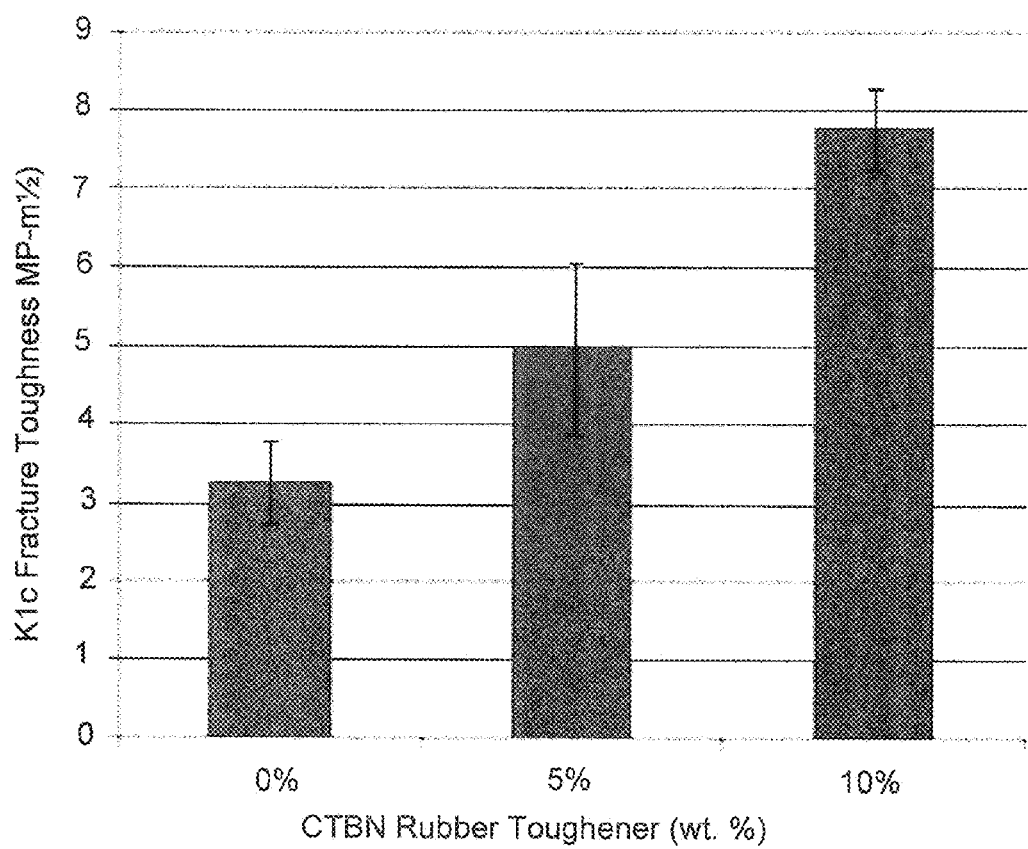

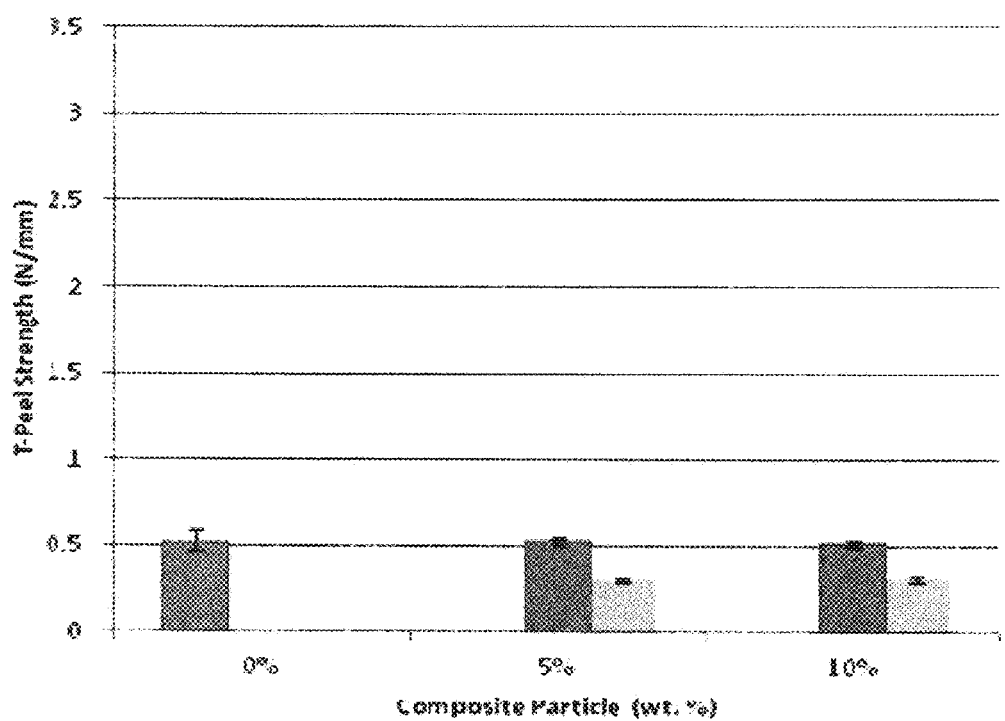

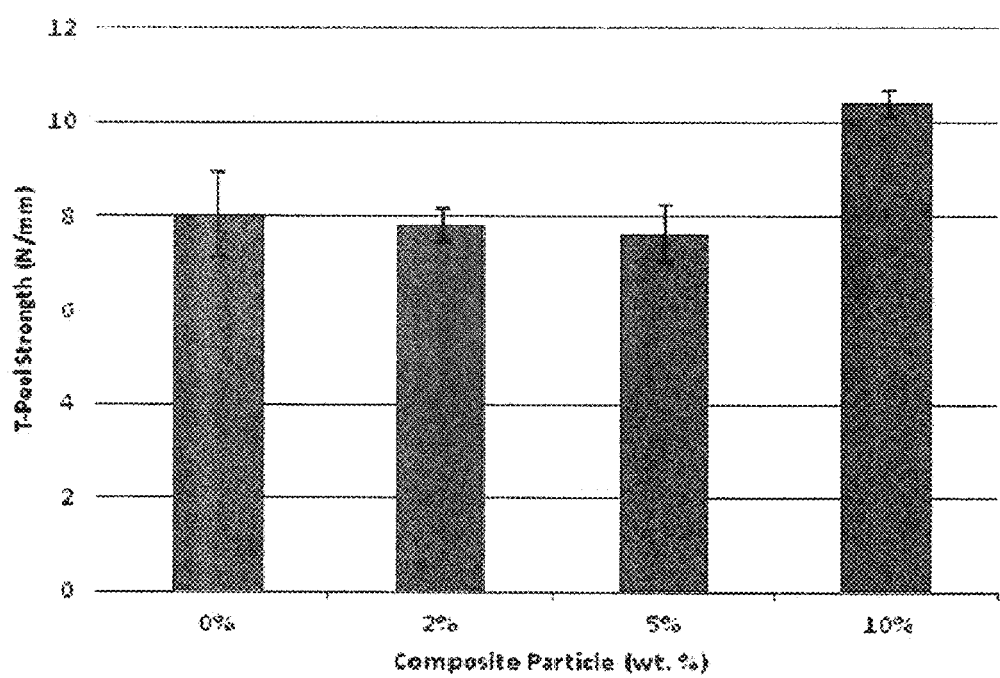

GLOSS

HAZE full scale

COMPOSITE PARTICLES AND A PROCESS FOR MAKING THE SAME

CROSS-REFERENCE TO RELATED APPLICATIONS

This patent application is a 371 national phase application of International Patent Application No. PCT/US2014/031078, filed on Mar. 18, 2014, which claims the benefit of U.S. Provisional Patent Application 61/803,613, filed on Mar. 20, 2013, U.S. Provisional Patent Application 61/819,229, filed on May 3, 2013, and U.S. Provisional Patent Application 61/919,215, filed on Dec. 20, 2013. The entire contents of the '613, '229, and '215 applications are incorporated herein by reference.

BACKGROUND OF THE INVENTION

Mixed phase particles including an organic phase and an inorganic phase have found utility in a wide variety of applications. When such particles are themselves used in polymer composites, it is desirable that they include surface roughness to enhance their interaction with the surrounding matrix and that their polymer cores be able to mitigate crack propagation. For example, it may be desirable that the organic core be soft (e.g., a polymer with a low glass transition temperature) or resilient. Alternatively or in addition, it may be desirable that the organic phase include polymer chains that are not highly cross-linked, as evidenced by a melting temperature or glass transition temperature. When such mixed phase particles are used as toner additives, it is desirable that such particles have surface roughness that facilitates multiple points of contact with the toner particle. The reduced density of mixed phase particles with respect to the neat inorganic material can reduce drop-off from the toner surface.

In addition, it is desirable to have a flexible method for producing mixed phase particles that may be used with a wide variety of chemistries, e.g., a generic approach that may be used for a range of polymer and other organic core materials.

BRIEF SUMMARY OF THE INVENTION

In one embodiment, composite particles comprise core particles having organosilica particles disposed about the core particles. The core particles may include an organic material, for example, natural waxes, synthetic waxes, polyesters, polyurethanes, polyester-styrene copolymers or blends, polyester-acrylic copolymers or blends, styrene-acrylics, or acrylic resins. The organic material may further comprise a polymerized ethylenically unsaturated monomer, for example, styrene or methacryloxypropyltrimethoxysilane.

The organosilica particles may be derived via reaction of an organosilane compound. The organosilane compound may have a formula: $R^1SiR^2_3$, wherein $R^1$ is $C_1$-$C_4$ alkyl or $C_2$-$C_4$ alkenyl or alkynyl, and wherein $R^2$ is alkoxy, chloro, bromo, or iodo, for example, vinyltrimethoxysilane, allyltrimethoxysilane, trimethoxymethylsilane, or trimethoxypropylsilane.

The composite particles may have a roundness R of from 1.1 to 2.0, e.g, 1.15 to 1.6 or 1.2 to 1.6, wherein the roundness is determined by the formula: $R=P^2/(4\pi S)$ wherein P is the perimeter of a cross-section of the particle and wherein S is the cross-sectional area of the particle.

The composite particles of claim 1 may further comprise metal particles or metal oxide particles disposed within the core particles, which metal or metal oxide particles may be surface-treated with a hydrophobizing agent.

The composite particles may be combined with toner particles to form a toner composition or may be part of a structural adhesive, a pressure-sensitive adhesive, a coating composition, a thermosetting polymer composition, or a thermoplastic polymer composition.

In another embodiment, a process for preparing composite particles comprises the steps of:

(a) providing an aqueous dispersion comprising polymer or wax particles and a surface agent, the aqueous dispersion having a pH of 8 or more, (b) adding an aqueous mixture comprising an at least partially hydrolyzed organosilane compound to the aqueous dispersion to form a mixture, wherein the organosilane compound has a formula: $R^1SiR^2_3$, wherein $R^1$ is $C_1$-$C_4$ alkyl or $C_2$-$C_4$ alkenyl and wherein $R^2$ is alkoxy, chloro, bromo, or iodo, and (c) forming the aqueous dispersion of composite particles via production of organosilica particles by a reaction of the at least partially hydrolyzed organosilane compound.

Providing may include adjusting the pH of an aqueous dispersion comprising polymer or wax particles and a surface agent to a pH of 8 or more. Alternatively or in addition, providing may comprise combining an aqueous dispersion of polymer particles with an ethylenically unsaturated monomer, allowing the monomer to migrate into the polymer particles, and polymerizing the monomer. Alternatively or in addition, providing may comprise dissolving a polymer in solvent, adding water to form an oil in water emulsion, and distilling the solvent from the emulsion to form an aqueous dispersion of polymer particles.

Dissolving may comprise dissolving the polymer and an ethylenically unsaturated monomer in the solvent. Alternatively or in addition, dissolving may comprise dissolving the polymer and the surface agent in the solvent. The surface agent may be added to the aqueous dispersion after distilling the solvent.

After distilling, the method may further comprise adding an ethylenically unsaturated monomer to the emulsion, allowing the monomer to migrate into the polymer particles, and polymerizing the monomer.

Alternatively or in addition, the method may further comprise polymerizing the surface agent. The surface agent may comprise polyethylene glycol-based polymer, quaternary amine-based organic compound, polyvinylpyrrolidone- or polypyrrolidone-based surfactant, or an anionic surfactant with a sulfate anionic component. The surface agent may comprise $SiH_{3-x}R^3_xR^4Q$, where x is 1, 2, or 3, $R^3$ is alkoxy, or chloro, bromo, or iodo, $R^4$ is $C_3$-$C_{22}$ branched or unbranched alkylene or alkenylene or aromatic group and optionally includes an ether, ester, or amine linkage, and Q is H, Cl, Br, F, hydroxyl, carboxylic acid, epoxy, amine, or a substituted or unsubstituted vinyl, acrylate, or methacrylate. For example, the surface agent may be methacryloxypropyltrimethoxysilane.

The method may further comprise a step (d) of purifying the aqueous dispersion of composite particles. Purifying may comprise diafiltering the aqueous dispersion of composite particles.

The method may further a step (e) of treating the composite particles with a hydrophobizing agent. The hydrophobizing agent may comprise a non-functionalized silicone fluid or a functionalized silicone fluid. Alternatively or in addition, the hydrophobizing agent may be a compound of the formula: $R_{4-n}SiX_n$ wherein n is an integer from 1 to 3, each R is independently selected from hydrogen, a $C_1$-$C_8$ alkyl group, a $C_3$-$C_8$ haloalkyl group, and a $C_6$-$C_{14}$ aryl group, and each X is independently a $C_1$-$C_{18}$ alkoxy group or a halo. Alternatively or in addition, the hydrophobizing agent may be a silazane. Alternatively or in addition, the hydrophobizing agent may comprise a charge modifying agent of the formula: $An-Z_c-Y_b-Ar(EW)_a$ wherein Ar represents an aromatic group, EW represents an electron withdrawing group, Y represents a spacer group, Z represents an alkylene group, An represents an anchor group, a is an integer from 1 to 5, b is 0 or 1, and c is 0 or 1.

The aqueous dispersion in any step may further comprise an ethylenically unsaturated monomer. The process may further comprise a step of crosslinking the ethylenically unsaturated monomer to crosslink the polymer particles.

Alternatively or in addition, the process may further comprise a step (f) of drying the aqueous dispersion.

BRIEF DESCRIPTION OF THE SEVERAL VIEWS OF THE DRAWING(S)

Figure 11A:
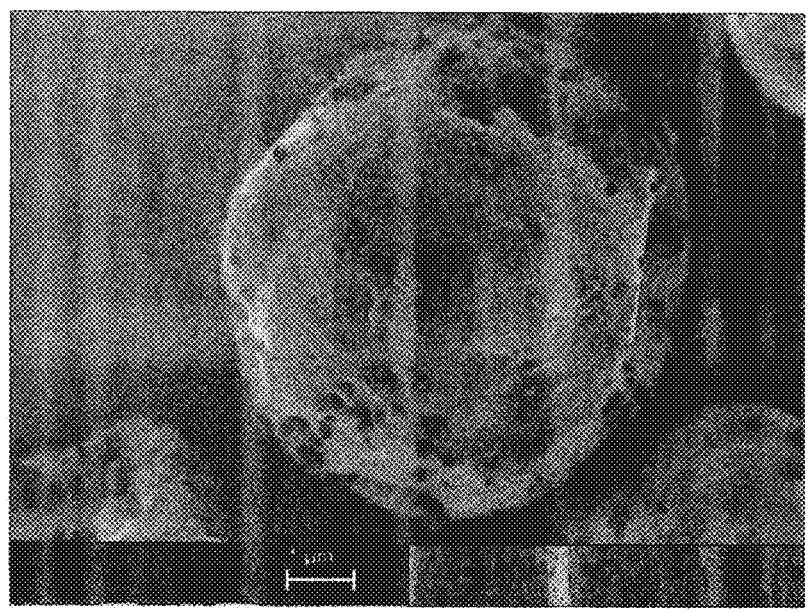
Figure 11B:
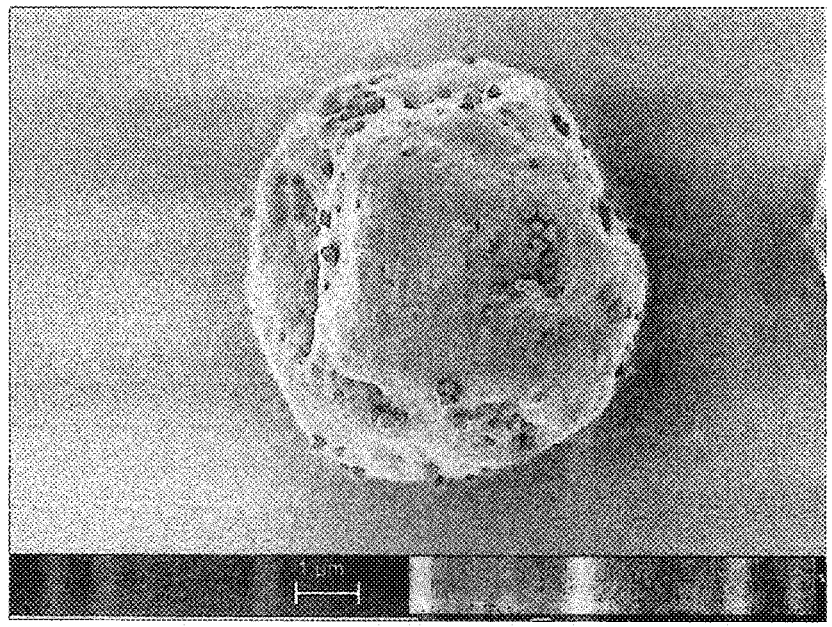
Figure 11C:
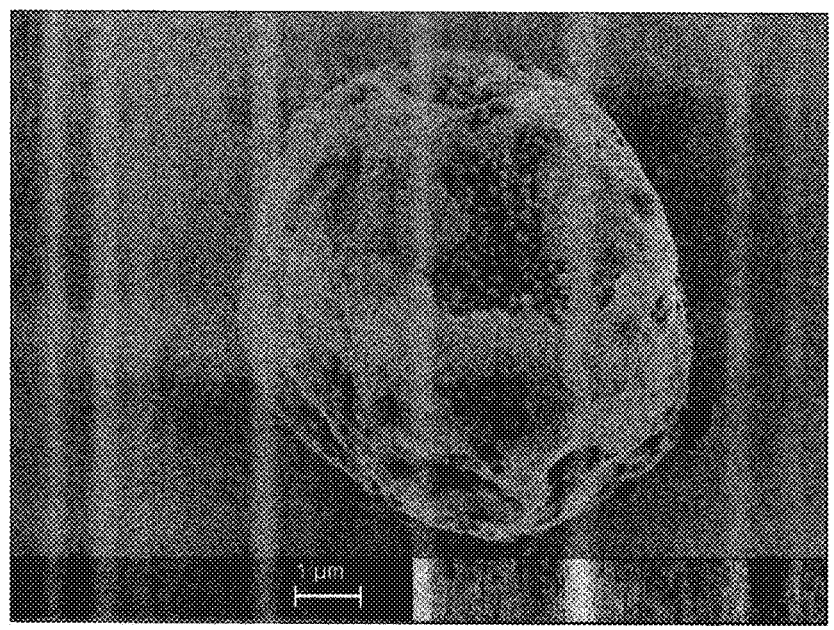

FIG. 11 includes SEM micrographs of electrophotographic developer compositions including composite particles described in Example 8 according to an embodiment of the invention after shaking for 0 min (FIG. 11A), 30 min (FIG. 11B), and 120 min (FIG. 11C).

Figure 12A:
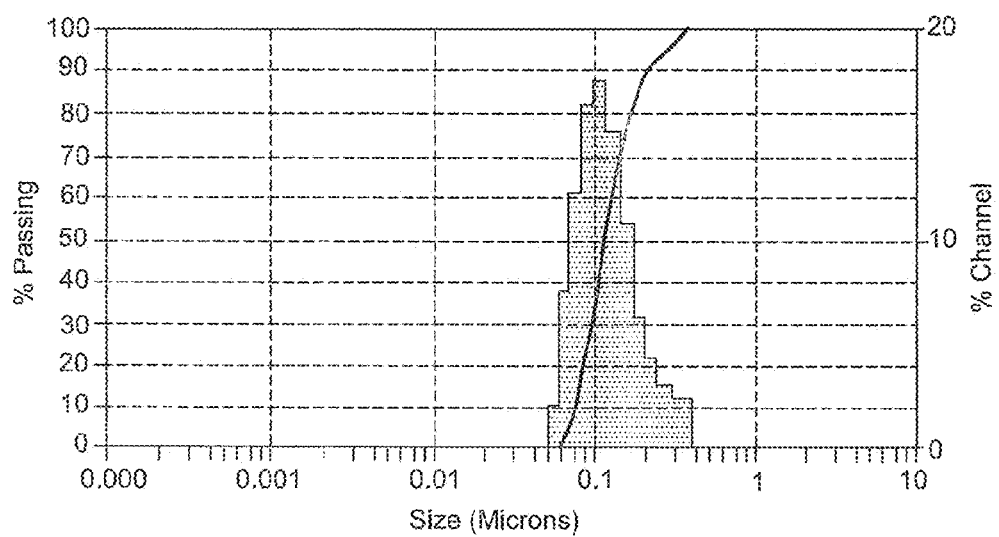
Figure 12B:
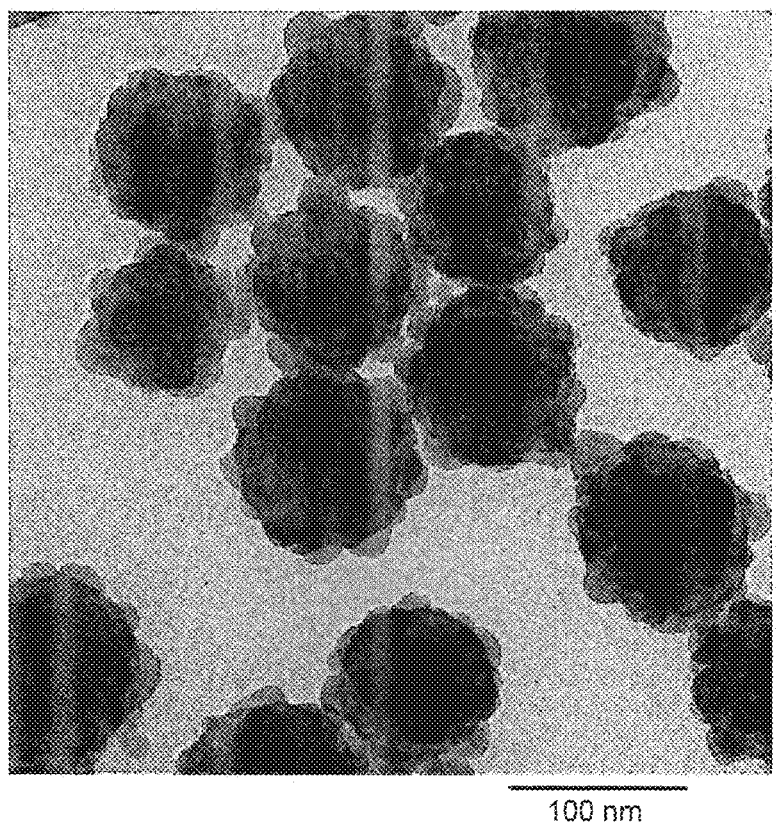

FIG. 12 includes the particle size distribution (FIG. 12A) and transmission electron micrograph (FIG. 12B) of composite particles described in Example 9 according to an embodiment of the invention.

Figure 12C:
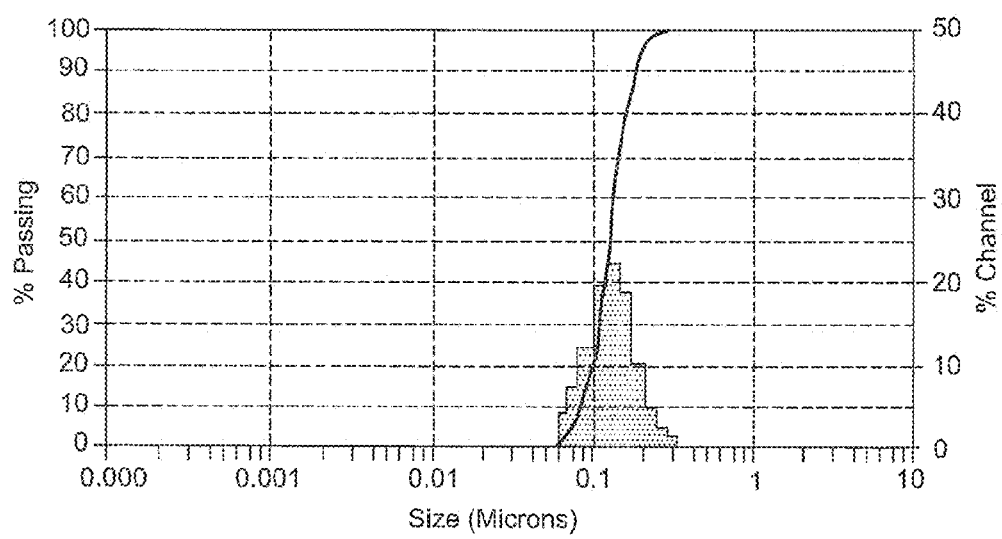

FIG. 12C includes the particle size distribution of the particles of FIG. 12A after hydrophobizing treatment as described in Example 9.

Figure 13A:
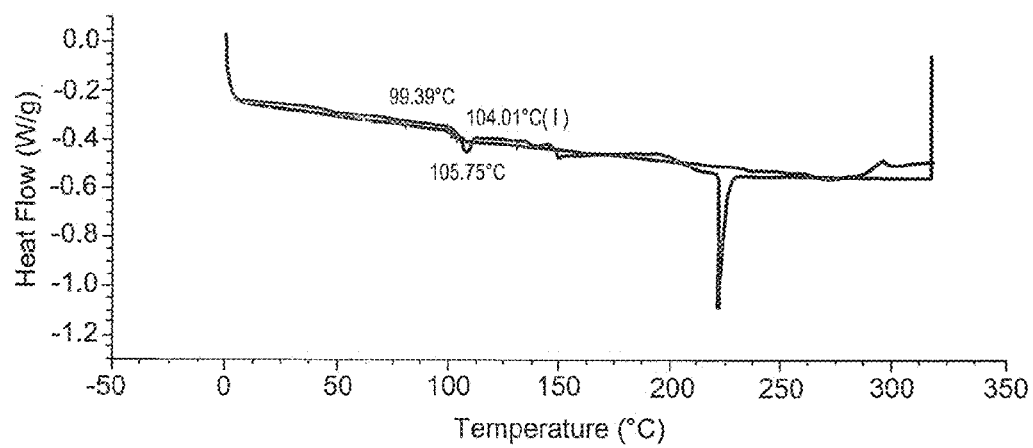
Figure 13B:
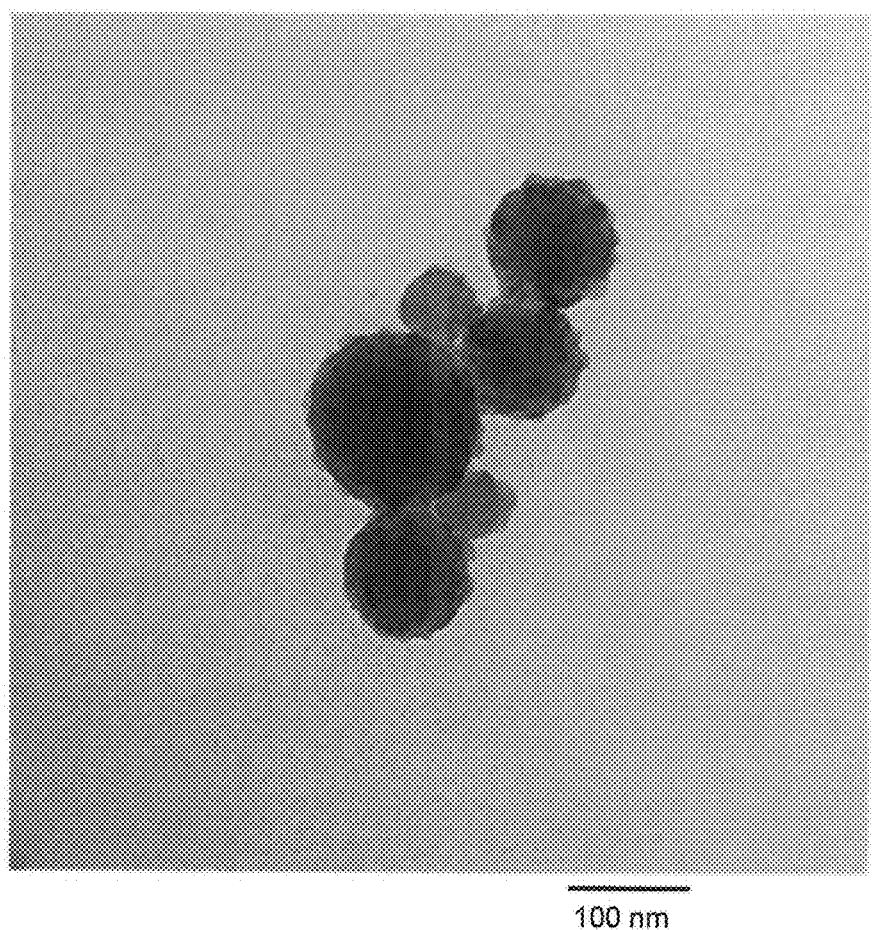

FIG. 13 includes the DSC profile (A) and transmission electron micrograph (B) of composite particles described in Example 10 according to an embodiment of the invention.

Figure 14:
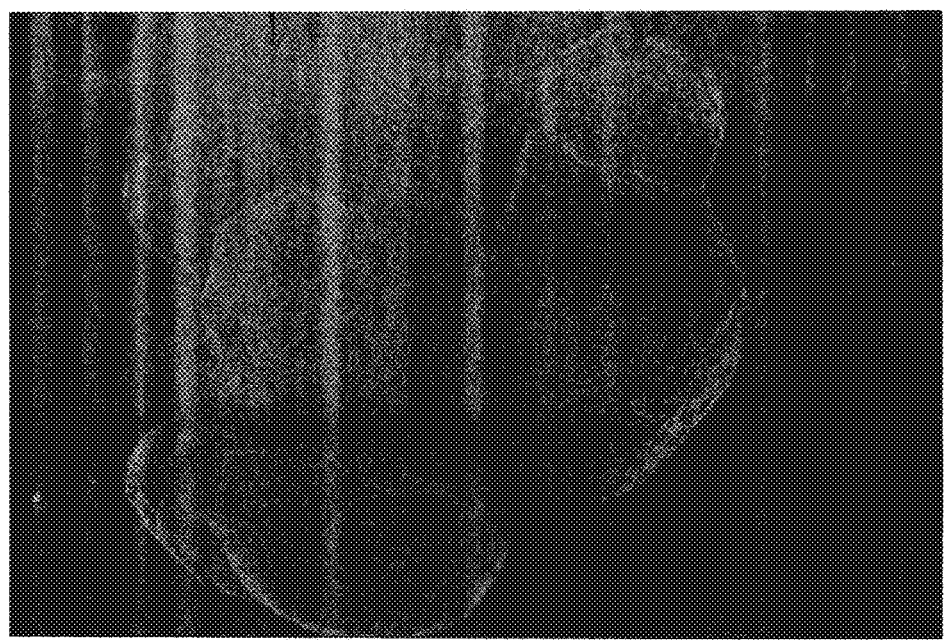

FIG. 14 is a scanning electron micrograph of a mixture of polyester toner and composite particles described in Example 22 according to an embodiment of the invention.

Figure 15A:
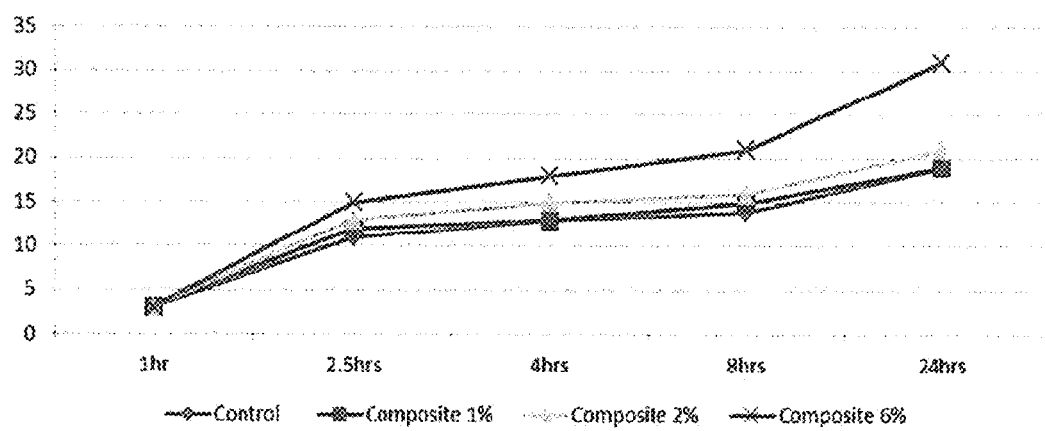

FIG. 15A illustrates the early hardness development (Konig) of coating compositions comprising 1 wt. %, 2 wt % and 6 wt. % of the inventive composite particle as compared with a control coating composition.

Figure 15B:
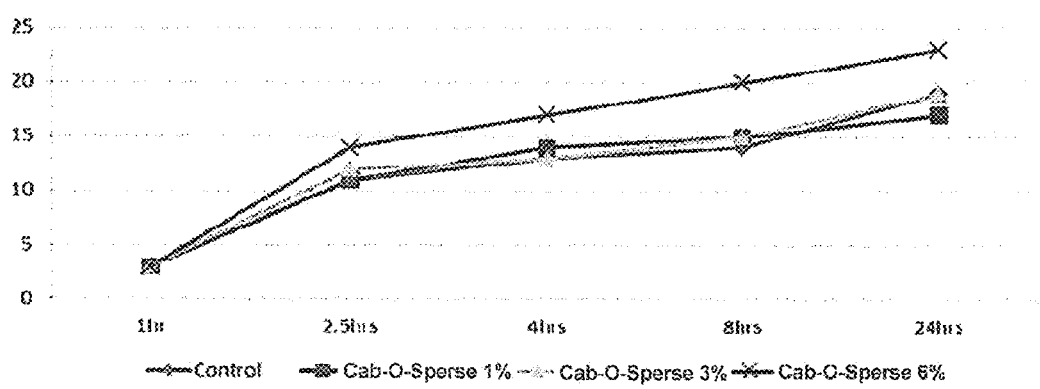

FIG. 15B illustrates the early hardness development (Konig) of coating compositions comprising 1 wt. %, 2 wt. % and 6 wt. % of fumed silica provided via a Cab-O-Sperse fumed silica dispersion as compared with a control coating composition not containing fumed silica.

Figure 15C:
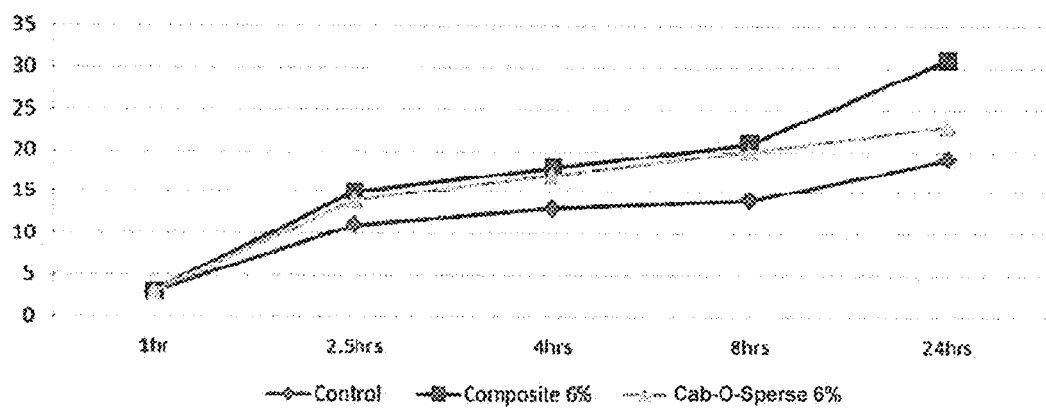

FIG. 15C illustrates the early hardness development (Konig) of coating compositions comprising 6 wt. % of the inventive composite particle and 6 wt. % fumed silica provided via a Cab-O-Sperse fumed silica dispersion as compared with a control coating composition.

FIG. 16A illustrates the effect of a rubber toughener on the T-peel strength of an epoxy adhesive formulation.

FIG. 16B illustrates the effect of a rubber toughener on the fracture toughness of an epoxy adhesive formulation.

FIG. 16C illustrates the effect of the inventive composite particles (dark gray: Example 11; light gray: Example 13) on the T-peel strength of an untoughened epoxy formulation.

Figure 16D:
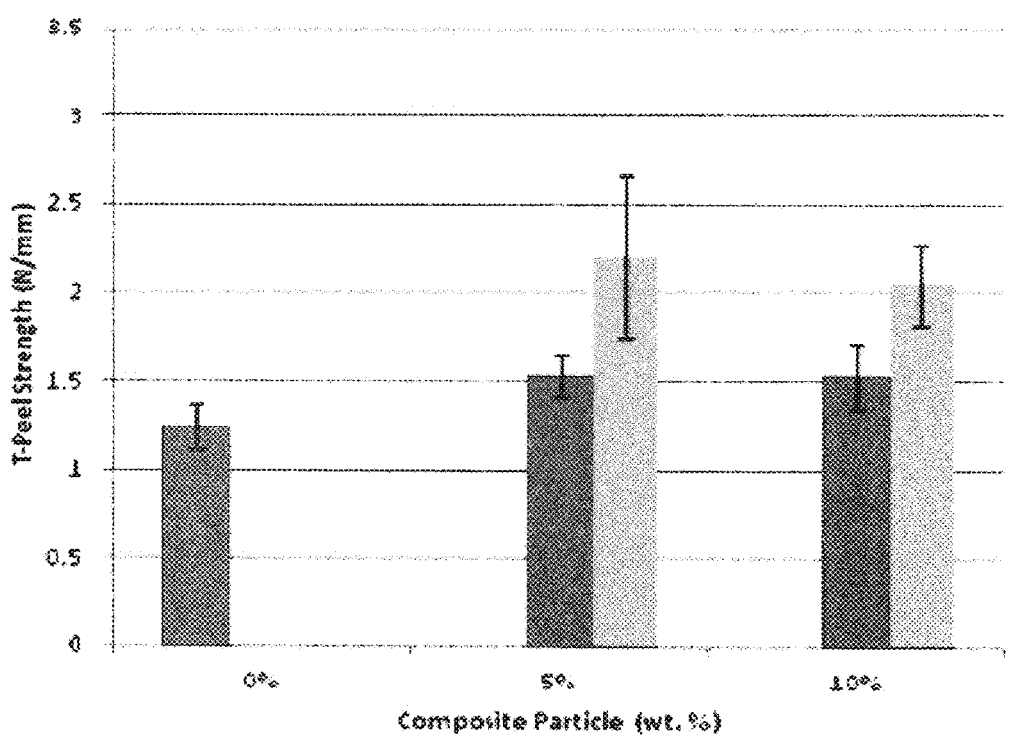

FIG. 16D illustrates the effect of the inventive composite particles on the T-peel strength of a epoxy formulation toughened with 5 wt % CTBN.

Figure 17A:
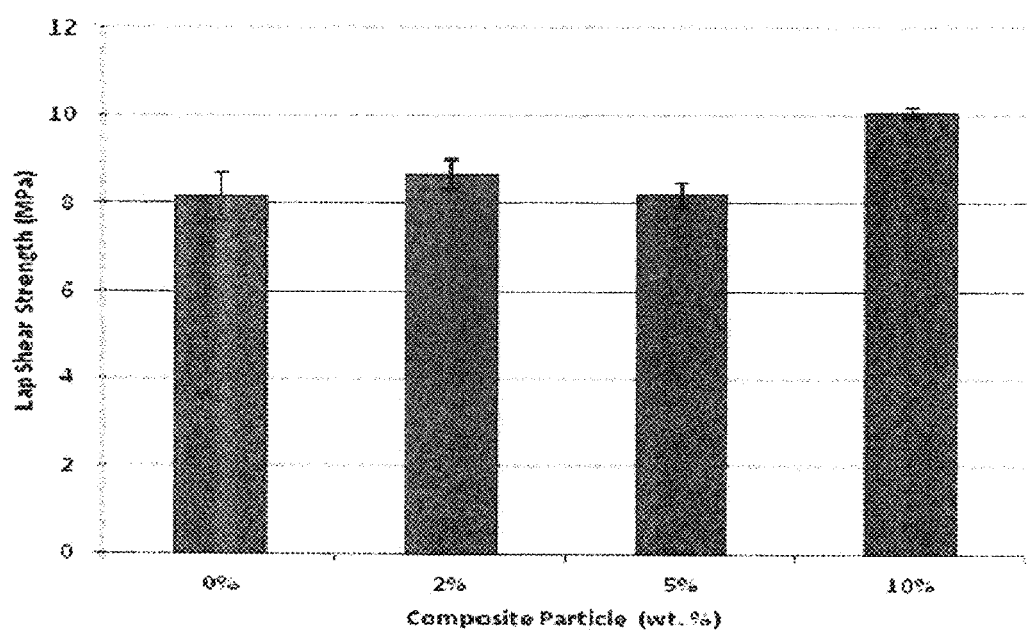

FIG. 17A illustrates the effect of the composite particles of Example 11 on the lap shear strength of a polyurethane adhesive formulation.

Figure 17B:
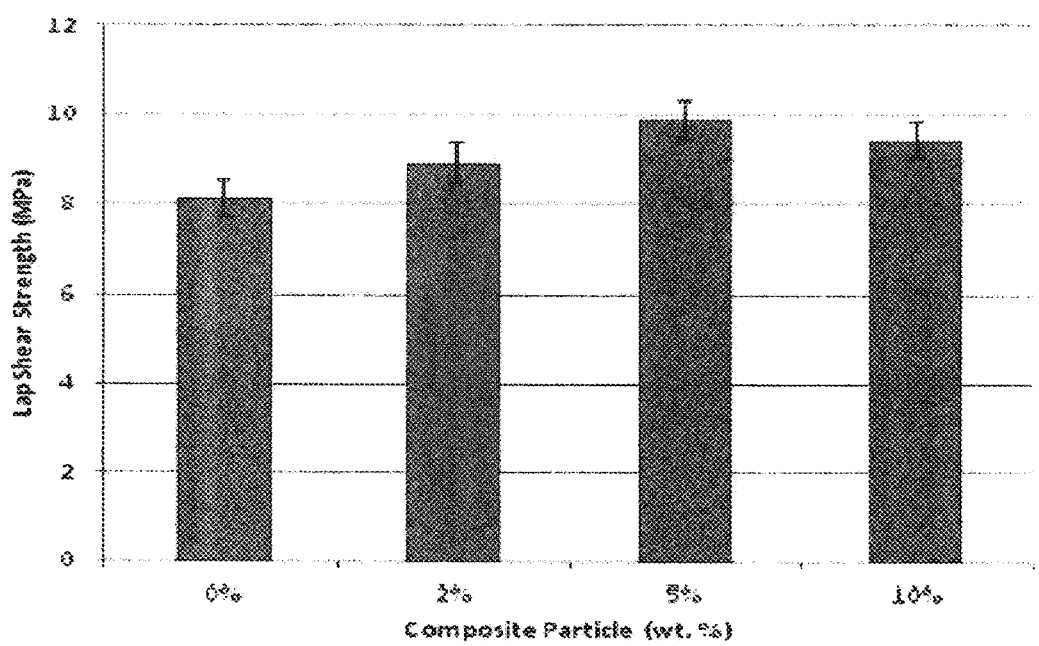

FIG. 17B illustrates the effect of the composite particles of Example 13 on the lap shear strength of a polyurethane adhesive formulation.

Figure 17C:
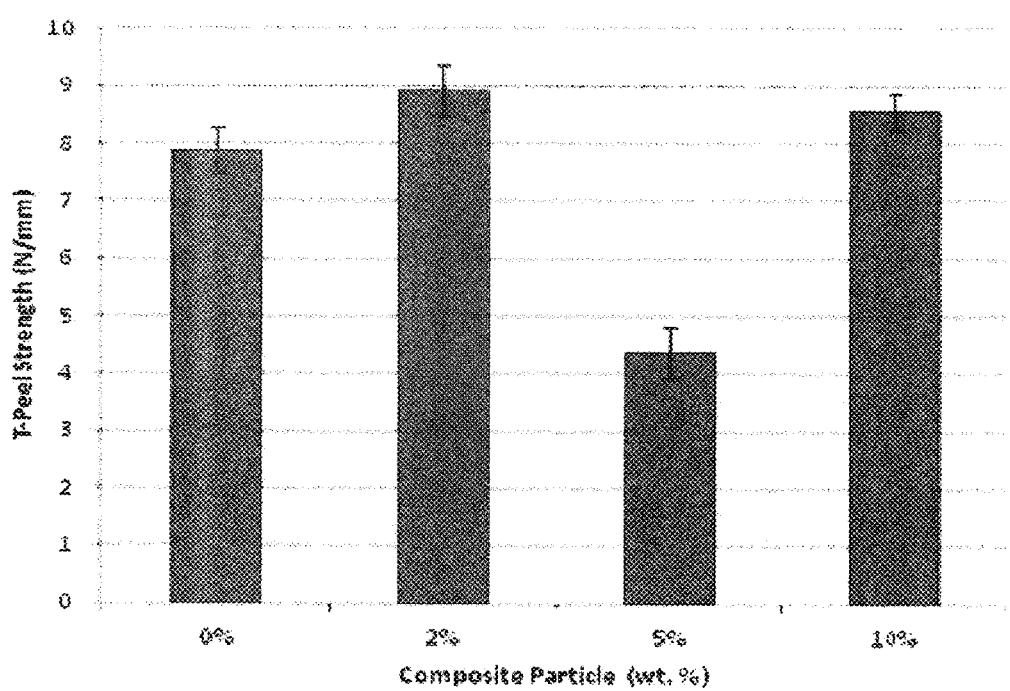

FIG. 17C illustrates the effect of the composite particles of Example 11 on the T-peel strength of a polyurethane adhesive formulation.

FIG. 17D illustrates the effect of the composite particles of Example 13 on the T-peel strength of a polyurethane adhesive formulation.

Figure 18:
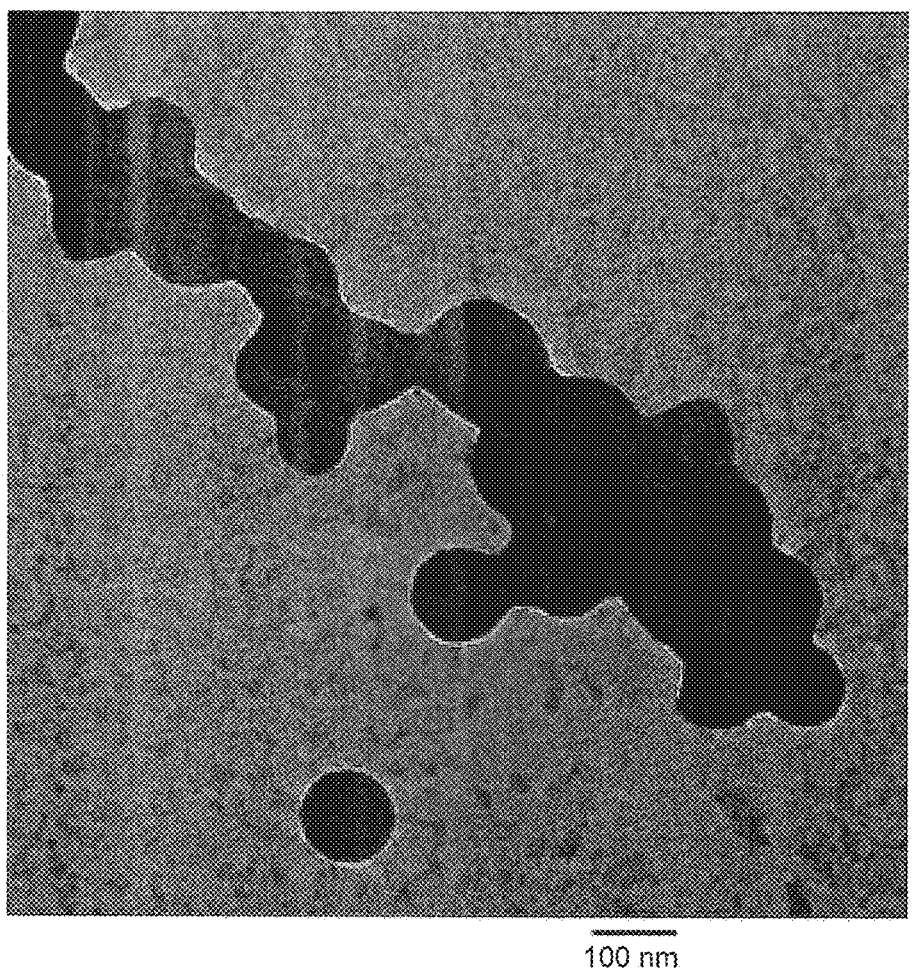

FIG. 18 is a transmission electron micrograph of the material derived from treatment of a polyester dispersion with TEOS as described in Example 21.

Figure 19A:
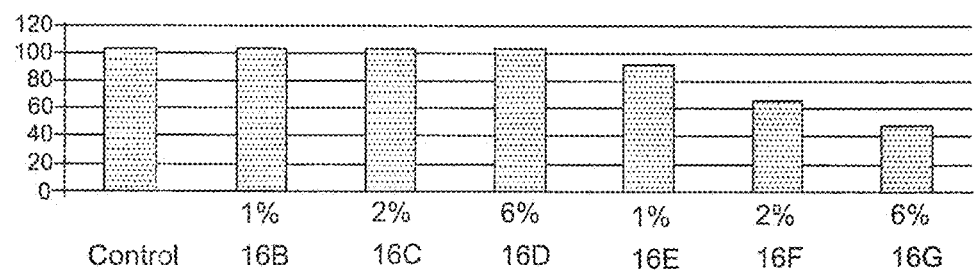

FIG. 19A illustrates the 60° gloss exhibited by substrates coated with Dispersions 16A-16F.

Figure 19B:
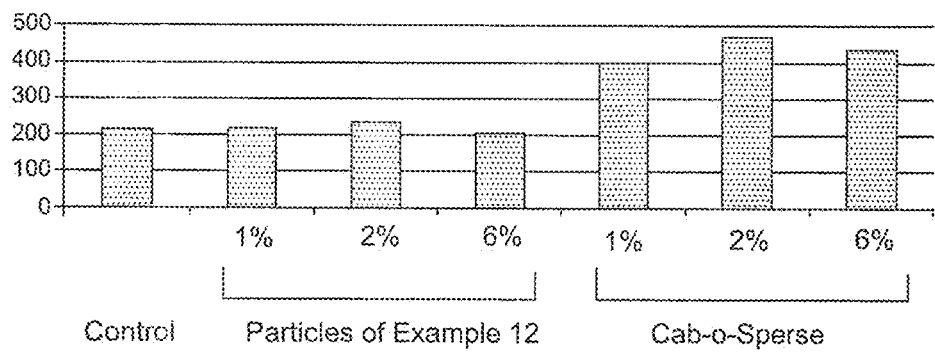

FIG. 19B illustrates the 20° haze exhibited by substrates coated with Dispersions 16A-16F.

Figure 20:
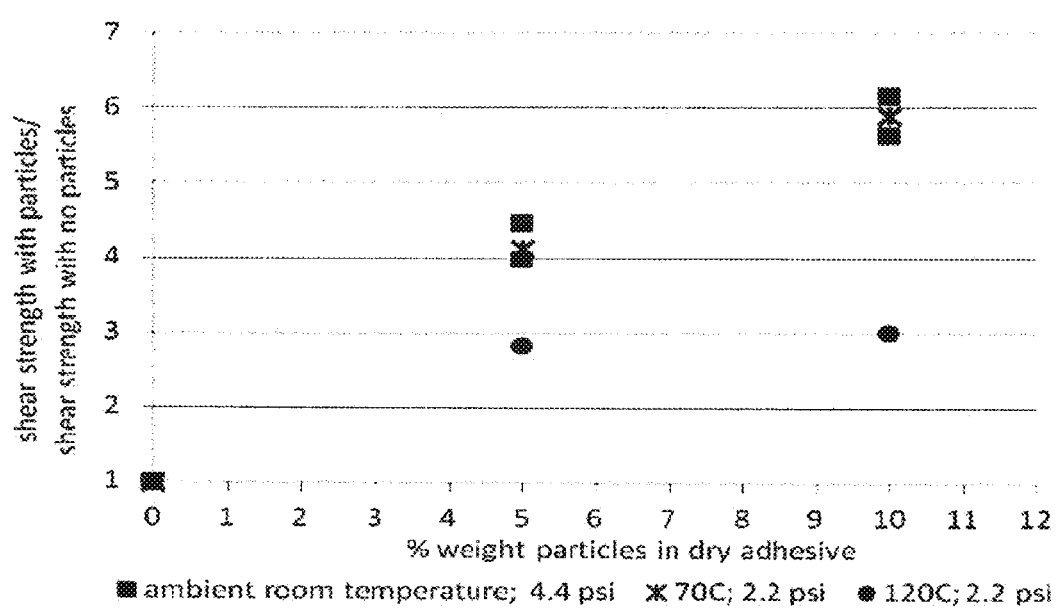

FIG. 20 illustrates the effect of the inventive composite particles on adhesive shear strength at various temperatures and test shears in a pressure sensitive adhesive composition.

Figure 21:
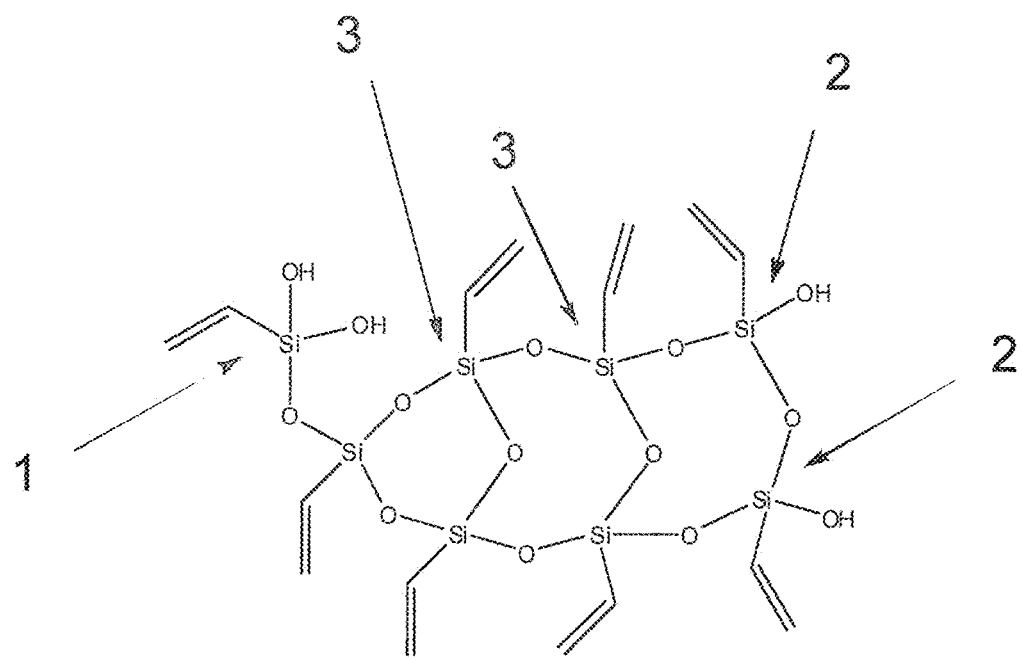

FIG. 21 is a schematic diagram of an organosilica network that can be formed by hydrolysis and condensation of vinyltrimethoxysilane.

Figures 22A, 22B:
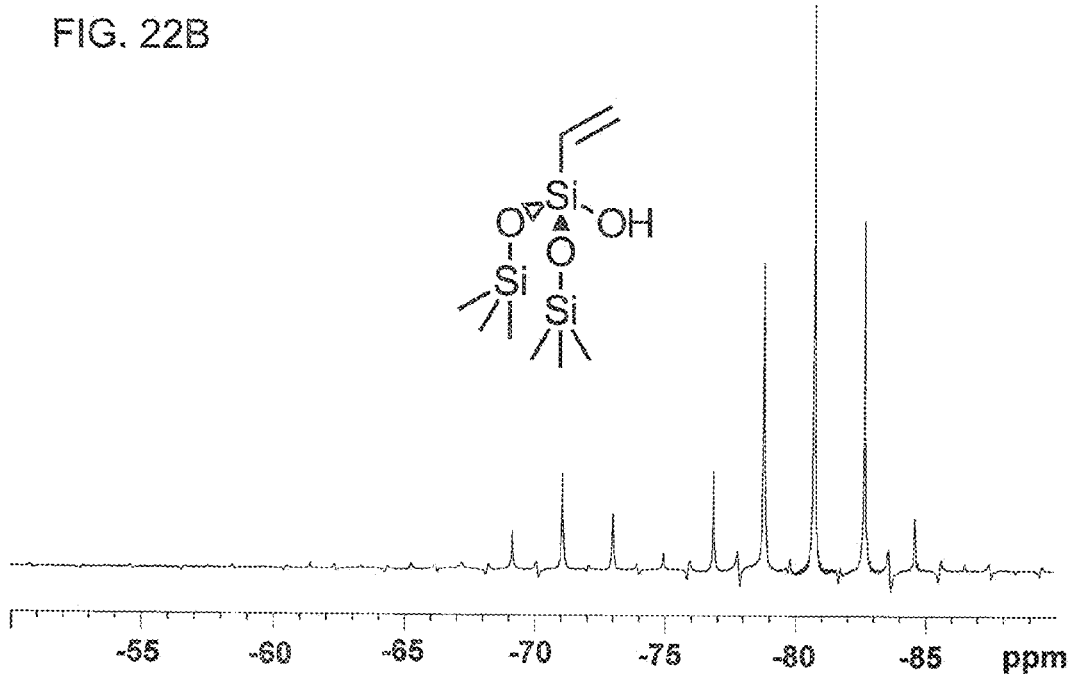

FIG. 22A is a CP/CPMG/MAS $^{29}$Si NMR spectrum of composite particles produced according to Example 6; FIG. 22B is a detail of the spectrum of FIG. 22A.

DETAILED DESCRIPTION OF THE INVENTION

In an embodiment, the invention provides composite particles comprising core particles having organosilica particles disposed about the core particles. The organosilica particles may be retained on the organic core material via non-covalent interactions, via covalent bonds, or via an alternative mechanism.

As used herein, "organosilica" is a solid material comprising silicon present as T units with any designation higher than T0 and having an attached R group that is an organic group, for example, $C_1$-$C_4$ alkyl, $C_2$-$C_4$ alkenyl, or $C_2$-$C_4$ alkynyl. The organosilica particles have a molar ratio of C to Si of 0.5 or greater, for example, from 1 to 4 or from 2 to 4, and/or a molar ratio of O to Si of 1.75 or less, for example 1.5 or less, for example from 1.25 to 1.75. For example, organosilica may be prepared by at least partial hydrolysis and condensation of one or more organosilane compounds, optionally accompanied by up to 50 molar percent of a tetraalkoxyorthosilicate, to form siloxane bonds.

T units in organosilica may be described by reference to NMR analysis, but their presence in the organosilica particles may be inferred from the use of the particular organosilane compounds discussed herein. The $^{29}$Si NMR spectra of silicon oxide-containing materials exhibit signal patterns in several well separated regions. The signal patterns in the NMR spectra of organosilica are due to the presence of various siloxane functional groups, commonly referred as M, D, T and Q structural units. The M, D, T, and Q notations refer to the number of oxygen atoms bonded to the silicon as monooxo (e.g., silicon bound to one oxygen), dioxo (i.e., silicon bound to two oxygens), trioxo (i.e., silicon bound to three oxygens), and quaternary (i.e., silicon bound to four oxygens), respectively, where the remaining (non-oxygen) bonds of the silicon are to carbon atoms, e.g., as part of an alkyl, alkenyl, alkynyl, aryl, or other substituted or unsubstituted organic group.

The $^{29}$Si NMR signals of the M, D, T and Q units appear in well-separated regions with chemical shifts between 2 and 20 ppm, between 0 and −25 ppm, between −40 and −70 ppm, and between −75 and −130 ppm, respectively, when the carbon atom (in the M, D, and T units) is part of a saturated aliphatic group, such as a methyl group. When the carbon for a T unit is part of an alkenyl group, the chemical shift appears about 10-15 ppm upfield of the shift for the corresponding alkyl substitution. Therefore, the $^{29}$Si NMR is a very powerful analytical technique for characterizing the nature of the silicon atoms in the organosilica particles. The nature of the silicon atoms in the organosilica particles can be determined from the distributions of $^{29}$Si NMR signals over well-resolved spectral regions.

The origin of the T units in the organosilica particles are also easily understood by reference to the process by which the organosilica particles are generated. As discussed herein, the organosilica particles result from the at least partial hydrolysis and reaction of an organosilane compound. For convenience, the explanation below employs vinyltrimethoxysilane (VTMS) as a specific organosilane compound, but the analysis is easily adapted to any of the other organosilane compounds discussed herein. The VTMS particles hydrolyze and react to produce networks of vinyl-silicon groups bound to each other via siloxane bonds. FIG. 21 is an example of a network that could be formed by this reaction. The silicon atoms are all T units because they have three oxygens and a carbon attached. The silicon atoms indicated by 3 are T3 units because the three oxygens are connected to additional silicon atoms. The silicon atoms indicated by 2 are T2 units because two of the oxygens are connected to additional silicon atoms. The silicon atom indicated by 1 is a T1 unit because only one of the oxygens is connected to an additional silicon atom. By extension, the silicon in VTMS is a T0 unit because the oxygen atoms in VTMS are connected to a silicon atom and to methyl groups—none of them are connected to additional silicon atoms. In contrast, the silicon atoms in inorganic silica (i.e., $SiO_2$) are all Q units because each silicon atom is connected to four oxygen atoms. For example, production of silica particles from hydrolysis and reaction of a neat tetraalkoxyorthosilicate, e.g., tetramethoxyorthosilicate, results in a network of silicon oxide in which the silicons are all present as Q units.

As discussed herein, NMR spectra were acquired using a Bruker Avance II NMR spectrometer with $^1$H resonance frequency at 400.13 MHz, and $^{29}$Si resonance frequency at 79.49 MHz, respectively. A 4-mm double resonance magic angle spinning (MAS) solid-state NMR probe was used. Typically, a magic angle spinning rate of 8000 Hz and a CP contact time of 10 ms were used. For enhancing the sensitivity of the NMR measurements, 20 full echoes of the NMR signals synchronized with MAS were generated using a train of refocusing RF pulses, called Carr-Purcell-Meiboom-Gill (CPMG) sequence. The combination of CP/MAS and CPMG techniques, called here as CP/CPMG/MAS, gives a signal enhancement of over a factor of 6, which makes it possible to obtain good $^{29}$Si NMR signals in a relatively short time. Typically, the NMR measurements were performed with the duration between the refocusing pulses of 6.5 ms, a recycle delay of 3 s, and the number of scans between 1000 and 4000. The $^1$H and $^{29}$Si NMR chemical shifts in ppm were referenced to the tetramethylsilane standard.

The core particles of the composite particles comprise, consist essentially of, or consist of an organic material. The organic material can be any suitable organic material and can be selected from waxes and organic polymeric materials. Suitable waxes include natural waxes such as carnauba wax, jojoba wax, and beeswax and synthetic waxes such as polyolefin waxes. The term polyolefin waxes generally refers to the homopolymers and copolymers of ethene, propene and other α-olefins. Both natural and synthetic waxes may be fully amorphous or at least partially crystalline but typically are malleable at room temperature. Polyolefin waxes are often prepared by the Ziegler process in a high-pressure polymerization or by degradation reactions and may be modified in a polar manner (cf. *Ullmann's Encyclopedia of Industrial Chemistry*, Weinheim, Basel, Cambridge, N.Y., Tokyo, 5th edition, Volume A 28, p. 146 ff). A variety of polyolefin waxes are available from Clariant GmbH. Polyolefin waxes may also be oxidized or grafted with polar reagents. The choice of wax may be influenced in part by the desired melting point or other thermal behavior.

Suitable organic polymeric materials include, but are not limited to, polyesters, polyurethanes, polyester-acrylic copolymers, polyester-acrylic blends, polyester-styrene copolymers, polyester-styrene blends, styrene-acrylics, and acrylic resins. In certain preferred embodiments, the organic polymeric material is a condensation polymer, e.g., polyesters and polyurethanes. Both crystalline and amorphous polymers, or polymers having crystalline and amorphous domains, may be used. Exemplary polyesters include those employed for use in toner and other applications, for example, those disclosed in U.S. Pat. No. and Patent Publications Nos. 2011/0065034, 2011/0086301, 7,951,519, and 2011/0053078 and in Fukuri, et al., *Journal of Imaging Science and Technology*, 55(1):010509-010509-8, 2011, the contents of which are incorporated herein by reference. Exemplary polyurethanes include those disclosed in PCT Publication WO2012/054664, the contents of which are incorporated herein by reference. The number average weight of the polymer can range from about 1000 to about 50,000, for example, from about 2000 to about 3000, from about 3000 to about 5000, from about 5000 to about 10000, from about 10000 to about 20000, from about 20000 to about 30000, from about 30000 to about 40000, or from about 40000 to about 50000.

In certain embodiments, the organic material further comprises a polymerized ethylenically unsaturated monomer comprising an ethylenically unsaturated group, for example, an ethylene group or an alkylene group. In certain embodiments, the ethylenically unsaturated monomer does not undergo polymerization at the ethylenically unsaturated group. Rather, a separate group on the monomer has polymerized. For example a silane containing monomer may polymerize by forming siloxane bonds with other monomers or by bonding with the core material via Si— or Si—O groups. In certain other embodiments, the ethylenically unsaturated monomer undergoes polymerization at the ethylenically unsaturated group with itself and/or with the organic polymeric material, so as to crosslink the organic polymeric material. Non-limiting examples of ethylenically unsaturated monomers include styrene and methacryloxypropyltrimethoxysilane.

The organosilica particles are derived from reaction of an organosilane compound. Typically, following at least partial hydrolysis, the hydrolysis products undergo polymerization and/or condensation to form organosilica particles. The organosilica particles can be retained to the surface of the core particles via covalent or non-covalent interactions of the organic groups bound to silicon or via an alternative mechanism. In some embodiments, the organic groups bound to silicon can react with functional groups on the surface of the core particles to form covalent bonds that adhere the organosilica particles to the core particles. For example, when the organosilane compound has an ethylenically unsaturated organic group, the ethylenically unsaturated group can react with ethylenically unsaturated organic groups that may be present on the surface of the core particles. Alternatively or in addition, Si—O groups in the organosilica may react or interact with the surface of the core particle.

The organosilane compound may have the formula: $R^1SiR^2_3$, wherein $R^1$ is $C_1$-$C_4$ alkyl, $C_2$-$C_4$ alkenyl, or $C_2$-$C_4$ alkynyl and wherein $R^2$ is alkoxy, e.g., methoxy, ethoxy, or isopropoxy, chloro, bromo, or iodo. Non-limiting examples of suitable organosilane compounds include vinyltrimethoxysilane, allyltrimethoxysilane, trimethoxymethylsilane, and trimethoxypropylsilane.

The composite particles preferably have a roundness R of from 1.1 to 2.0, e.g., 1.15 to 2.0, wherein the roundness is determined by the formula: $R=P^2/(4\pi S)$ wherein P is the perimeter of a cross-section of the particle and wherein S is the cross-sectional area of the particle as measured on over 500 particles observed by transmission electron microscopy performed at 80 kV. Preferably, the composite particles have a roundness R of from 1.2 to 1.6 (e.g., from 1.2 to 1.5).

The roundness of the composite particles may be determined by TEM (transmission electron microscope) evaluation. Conventional image analysis software is used to define a perimeter P of a cross-section of the particle. The same software is used to calculate particle cross-sectional area S. These measurements are made for multiple particles, preferably at least 500 particles, on multiple TEM images. Particle Roundness is equal to $P^2/(4\pi S)$ (John C. Russ, The Image Processing Handbook, CRC Press, 4$^{th}$ edition, 2002). The roundness of an ideal spherical particle is 1.0.

In certain embodiments, the composite particles are treated with a hydrophobizing agent. Typically, the hydrophobizing agent is bonded either covalently or non-covalently to the composite particles. In certain embodiments, the hydrophobizing agent can be a silicone fluid. The silicone fluid can be a non-functionalized silicone fluid or a functionalized silicone fluid. Non-limiting examples of useful non-functionalized silicone fluids include polydimethylsiloxanes, polydiethylsiloxanes, phenylmethylsiloxane copolymers, fluoroalkylsiloxane copolymers, diphenylsiloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, polyalkylene oxide modified silicones, cyclic polysiloxanes of the D3, D4, and D5 types, and the like.

Functionalized silicone fluids can comprise, for example, functional groups selected from the group consisting of vinyl, hydride, silanol, amino, and epoxy. The functional groups may be bonded directly to the silicone polymer backbone or may be bonded through intermediary alkyl, alkenyl, or aryl groups.

In certain embodiments, the hydrophobizing agent comprises a hydrophobizing silane. For example, the hydrophobizing silane can be a compound of the formula: $R^3_{4-n}SiX_n$ wherein n is 1-3, each $R^3$ is independently selected from the group consisting of hydrogen, a $C_1$-$C_{18}$ alkyl group, a $C_3$-$C_{18}$ haloalkyl group, and a $C_6$-$C_{14}$ aromatic group, and each X is independently a $C_1$-$C_{18}$ alkoxy group or halo.

In certain embodiments, the hydrophobizing agent comprises a functionalized silane. The functionalized silane can comprise at least one functional group selected from the group consisting of acrylate, methacrylate, amino, anhydride, epoxy, halogen, hydroxyl, sulfur, vinyl, isocyanate, and combinations thereof.

In certain embodiments, the hydrophobizing agent comprises a silazane, for example, the hydrophobizing agent can be hexamethyldisilazane, octamethyltrisilazane, a cyclic silazane, and the like.

In certain embodiments, the hydrophobizing agent comprises a charge modifying agent such as one or more of those disclosed in U.S. Patent Application Publication 2010/0009280, the contents of which are incorporated herein by reference. Exemplary charge modifying agents include, but are not limited to, agents having the formula: An-$Z_c$—$Y_b$—Ar(EW)$_a$, where Ar represents an aromatic group, EW represents an electron withdrawing group, Y represents a spacer group, Z represents an alkylene group, An represents an anchor group via which the charge modifying agent is attached to the surface, a is an integer from 1 to 5, b is 0 or 1, and c is 0 or 1. Specific charge modifying agents include, but are not limited to, 3-(2,4-dinitrophenylamino) propyltriethoxysilane (DNPS), 3,5-dinitrobenzamido-n-propyltriethoxysilane, 3-(triethoxysilylpropyl)-p-nitrobenzamide (TESPNBA), pentafluorophenyltriethoxysilane (PFPTES), and 2-(4-chlorosulfonylphenyl)ethyltrimethoxysilane (CSPES).

Alternatively or in addition, the dimethylsiloxane co-polymers disclosed in U.S. Patent Publication No. 2011/0244382 A1, the contents of which are incorporated herein by reference, may be used to treat the composite particles. Exemplary dimethylsiloxane co-polymers include co-polymers of the formula:

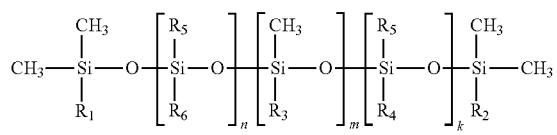

wherein $R_1$ is —H, —$CH_3$, $R_2$=—H, —$CH_3$, $R_3$=—$CH_3$, —$CH_2CH_3$, —$CH_2CH_2CH_3$, $CH_2Ar$, —$CH_2CH_2Ar$, —Ar, —$CH_2CH_2CF_3$, or —$CH_2CH_2$—$R_f$ with $R_f$ being a $C_1$ to $C_8$ perfluoroalkyl group, $R_4$ is —$CH_3$, —$CH_2CH_3$, —$CH_2$, $C_2CH_3$, —$CH_2CH_2CF_3$, or —$CH_2CH_2$—$R_f$ with $R_f$ being a $C_1$ to $C_8$ perfluoroalkyl group, $R_5$ is —$CH_3$, —$CH_2CH_3$, —$CH_2Ar$, —$CH_2CH_2Ar$, or —Ar, $R_6$ is —H, —OH, —$OCH_3$, or —$OCH_2CH_3$, Ar is unsubstituted phenyl or phenyl substituted with one or more methyl, halogen, ethyl, trifluoromethyl, pentafluoroethyl, or —$CH_2CF_3$ groups, n, m, and k are integer numbers, n=1, m=0, and k=0, and wherein the co-polymer has a molecular weight from 208 to about 20,000.

In other embodiments, the invention provides a process for preparing the inventive composite particles. The process comprises the steps of (a) providing an aqueous dispersion comprising polymer or wax particles and a surface agent, the pH of the dispersion being 8 or more, (b) adding an aqueous mixture comprising an at least partially hydrolyzed organosilane compound to the aqueous dispersion to form a mixture, wherein the organosilane compound has a formula: $R^1SiR^2_3$, wherein $R^1$ is $C_1$-$C_4$ alkyl, $C_2$-$C_4$ alkenyl, or $C_2$-$C_4$ alkynyl and wherein $R^2$ is alkoxy, e.g., methoxy, ethoxy, or isopropoxy, chloro, bromo, or iodo, and (c) forming the aqueous dispersion of composite particles via production of organosilica particles via reaction of the organosilane compound.

To produce composite particles according to one embodiment, an aqueous wax dispersion having about 5 wt % wax is provided. A commercial wax dispersion may be employed and may be diluted with water to adjust the concentration. Suitable wax dispersions include the Aquaslip™ dispersions from Lubrizol, Syncera™ emulsions from Paramelt, Aquacer™ emulsions from BYK Chemie, and Hydrawax™ emulsions from Sasol Wax North America Corporation. Typical commercial wax dispersions include surface agents such as surfactants. If desired, an additional surfactant may be added. Exemplary surfactants may include alkylene glycols or ethoxylated alcohols and other surfactants suitable for use with waxes. Alternatively or in addition, a silane surface agent such as those described below may be employed. The pH of the dispersion is typically adjusted to at least 8, for example, from 8 to 8.5, from 8.5 to 9, from 9 to 9.5, from 9.5 to 10, 10 to 10.5, from 10.5 to 11, from 11 to 11.5, from 11.5 to 12, or from 12 to 12.5.

To form composite particles, an aqueous solution of the organosilane compound is prepared with about a 2:1 amount by weight of the organosilane compound with respect to the wax, for example, from about 1.5:1 to about 2.5:1 by weight of the organosilane compound. Increased amounts of silane with respect to wax may increase the organosilica particle size, the number of organosilica particles disposed on the wax particle surface, or both. The silane solution can have about 25%, for example, from about 20% to about 30%, the volume of the wax dispersion. The silane solution is stirred until it is dissolved, for example, about 0.5-1 hour for vinyltrimethoxysilane. The wax dispersion is brought to the desired pH using a suitable base, e.g., ammonium hydroxide. The organosilane compound solution is then slowly added to the wax dispersion, for example, over the course of about 1 minute, for example, over the course of from about 30 seconds to about 90 seconds. The reaction is allowed to proceed at ambient temperature, e.g., from 20° C. to 25° C., for an appropriate amount of time, for example, about 3 hours to about 7 hours, e.g., about 5 hours.

In certain embodiments, the composite particle is prepared from a polymer latex including a surface agent. In one embodiment, the polymer latex can be prepared by phase inversion. Briefly, a polymer is dissolved in a solvent. After the polymer is fully dissolved in solvent, a base (e.g., ammonium hydroxide, sodium hydroxide, potassium hydroxide, triethyl amine) is added to neutralize the acid group in the polymer. Water is then added to the polymer/solvent solution to form a dispersion, following which the solvent is distilled off to form a latex of the polymer in water. Parameters that affect the particle size of the latex include the acid number of the resin, the type and amount of base, and the solvent used to dissolve the polymer.

Formation of the polymer latex, or dispersion, can begin by preparation of a solution of the polymer in organic solvent. The polymer may be any polymer that is insoluble in water from pH about 6.5 to about 7.5 but is sufficiently acidic to form a stable latex in water without added dispersant. The polymer can be as described herein in connection with the composite particle. The polymer can have an acid number from about 5 to about 50 mg KOH/g, for example, from about 5 to about 10, from about 10 to about 20, from about 20 to about 30, from about 30 to about 40, or from about 40 to about 50 mg KOH/g.

The solvent is preferably one that will both solubilize the polymer and which exhibits at least some solubility in water. The solubility of organic solvent in water should be greater than 1 g in 100 mL of water. For example, methyl ethyl ketone has a solubility of 12 wt. % in water. Exemplary solvents include alcohols, ketones, esters, ethers, chlorinated solvents, nitrogen containing solvents and mixtures of two or more solvents, for example, acetone, isopropyl alcohol, ethanol, methanol, methyl acetate, methyl ethyl ketone, tetrahydrofuran, cyclohexanone, ethyl acetate, N,N dimethylformamide, dioctyl phthalate, toluene, xylene, benzene, dimethylsulfoxide, acetonitrile, and mixtures of any of these.

The polymer/solvent solution may include about 60 wt % of polymer in solvent, for example, from about 20 wt % to about 70 wt %, from about 40 wt % to about 65 wt %, or from about 50 wt % or about 55 wt % to about 62 wt %. The solvent may include a mixture of solvents, for example, 20 wt % isopropyl alcohol in methylethyl ketone or ethyl acetate. Gentle heating, e.g., well below the boiling point of the solvent, may facilitate dissolution of the polymer.

A base is then added to neutralize at least a portion of the acid groups on the polymer. A stoichiometric amount of base may be employed. A less than stoichiometric amount of base can also be used. A surface agent, described below, may be added to the solution at this point, following which water is slowly added with stirring to prepare a dispersion. Sufficient water should be added to emulsify the polymer/solvent solution; excess water will merely dilute the dispersion. In some implementations, the water may be added in a ratio of from about 4.5 parts by weight of water to 1 part solvent to about 5:1, for example, from about 4:1 to about 5.5:1, or from about 3.5:1 to about 6:1.

A surface agent may be added to the solvent/polymer phase before adding water to the polymer/solvent solution, or after the formation of the latex. When used, the surface agent is preferably added to the polymer/solvent solution.

The surface agent may be used in an amount of about 1 wt % to about 30 wt % with respect to the polymer, for example, about 1% to about 10%, about 10% to about 20%, or about 20% to about 30%. The surface agent may be a silylated surface agent having the formula: $SiH_{3-x}R^3{}_xR^4Q$, where x is 1, 2, or 3, $R^3$ is alkoxy (e.g., methoxy, ethoxy, or isopropoxy), chloro, bromo, or iodo, $R^4$ is $C_3$-$C_{22}$ branched or unbranched alkylene or alkenylene, and Q is H, Cl, Br, F, hydroxyl, carboxylic acid, epoxy, amine, or a substituted or unsubstituted vinyl, acrylate, or methacrylate. Preferably, x is 2 or 3. $R^4$ may additionally include an ether, ester, or amine linkage or may be aromatic. In one implementation, the surface agent is methacryloxypropyltrimethoxysilane. When $R^1$ is chloro, bromo, or iodo, hydrolysis of the surface agent will produce the corresponding acid (e.g., HCl), which will change the pH of the reaction media. This may in turn require adjustment of the reagent amounts discussed elsewhere herein. Following hydrolysis, the surface agent should be insoluble or have very limited solubility in water; the unhydrolyzed surface agent should be soluble in the solvent used to dissolve the polymer. In an alternative embodiment, the surface agent is not silylated but is a polyethylene glycol-based polymer, quaternary amine-based organic compound, polyvinylpyrrolidone- or other polypyrrolidone-based surfactant, or an anionic surfactant with a sulfate anionic component.

Following formation of the dispersion, it may be heated to below the boiling point of water to distill off the solvent. The solvent may also be distilled at reduced pressure. In some implementations, removal of the solvent is optional. Alternatively or in addition, at least 10%, e.g., at least 20%, at least 30%, at least 40%, at least 50%, at least 60%, at least 70%, at least 80%, at least 90%, at least 95%, or at least 98% of the solvent is removed. Because the solvent is at least partially miscible with water, where it is desired to remove substantially all of the solvent, an excess of fluid with respect to the original amount of solvent should be removed. A phase diagram may assist the skilled artisan in selecting a desirable distillation temperature. If the surface agent has not already been added to the reaction mixture, it may be added to the latex resulting after distillation.

In some embodiments, a styrenic, acrylic, or other monomer that polymerizes through a free radical process may be incorporated into the latex at the same time or at a different time than the surface agent. The monomer may be added to the polymer solution or combined with the organic solvents to dissolve the polymer before the phase inversion process. Alternatively or in addition, the monomer may be diffused into the polymer micelles after the latex is formed or may be diffused into the polymer micelles of a commercial latex. Exemplary monomers include styrene, alkyl or vinyl substituted styrene, methyl methacrylate, fluorinated methacrylates, and other styreneic or (meth)acrylic monomers.

The latex particles may be crosslinked prior to formation of the organosilica particles, with or without the presence of the additional monomer. For example, a surface agent with a carbon-carbon double bond may be crosslinked, or double bonds in the polymer itself may be crosslinked. For crosslinking, a radical initiator may be diffused into the latex particles. Where a monomer is diffused into the latex, the initiator and monomer may be combined and diffused into the latex together. Exemplary initiators include thermally or UV activated radical and ionic initiators, e.g., azobisbutyronitrile (AIBN) and benzoyl peroxide. After addition of the initiator, the system may be polymerized for 4-8 hours at a temperature in excess of the activation temperature. The crosslinking density may be adjusted by varying the amount of additional monomer that is introduced into the system.

In an alternative embodiment, the polymer particles may be provided as an emulsion. For example, emulsion polymerization of chain-growth polymers results in an aqueous emulsion containing polymer particles. Such methods are commonly used to prepare polymers that grow by radical polymerization, for example, polyolefins, acrylic polymers such as polymethyl methacrylate and fluorinated methacrylates, styrenic polymers such as polystyrene or polymerized alkyl or vinyl substituted styrene, and copolymers of any of these such as styrene-acrylates or cross-linked polystyrenes. Commercial emulsions are widely available and should be stable under the reaction conditions, e.g., pH, used to produce the composite particles. Examples of polymer emulsions include the Joncryl™ styrene-acrylic resins available from BASF and Rhoplex™ acrylic resins available from Dow Chemical Corporation. In this embodiment, the surface agent would be added to the latex prior to addition of the organosilane precursor. The addition of a surface agent may be optional with commercial polymer emulsions, which are typically stabilized with surface agents such as surfactants. In addition, depending on the composition of the polymer, it may not be necessary to neutralize acid groups on the polymer.

Any suitable particulate material may also be added to the polymer dispersion before formation of the organosilica particles, provided that the particulate material is compatible with the polymer dispersion. Non-limiting examples of suitable particulate materials include metal or metal oxide particles. Such a material may be added at about 10-20 wt % with respect to the polymer and may be added to the mixture at any suitable time. The particles may have a number average particle size from 10 nm to about 30 nm. Of course, it is easier to make small composite particles with smaller metal or metal oxide powders.

Exemplary metal powders may include any desirable metal and may take any shape, including rods, flakes, or prolate shapes. Metal oxide particles appropriate for use with the present invention include silica, alumina, germania, ceria, molybdenum oxide, titania, zirconia, zinc oxide, iron oxides, including but not limited to magnetite ($Fe_3O_4$) and various forms of $Fe_2O_3$, niobium oxide, vanadium oxide, tungsten oxide, tin oxide, or mixtures or mixed oxides of any two or more of these. For use as external toner additives, the metal oxide particles will typically include at least one of silica, alumina, and titania.

The metal or metal oxide particles should be compatible with the polymer. Metal oxide particles may need to be treated with a hydrophobizing agent to render them compatible. Typically, the hydrophobizing agent is bonded either covalently or non-covalently to the metal or metal oxide particles. In certain embodiments, the hydrophobizing agent can be a silicone fluid. The silicone fluid can be a non-functionalized silicone fluid or a functionalized silicone fluid. Non-limiting examples of useful non-functionalized silicone fluids include polydimethylsiloxanes, polydiethylsiloxanes, phenylmethylsiloxane copolymers, fluoroalkylsiloxane copolymers, diphenylsiloxane-dimethylsiloxane copolymers, phenylmethylsiloxane-dimethylsiloxane copolymers, phenylmethylsiloxane-diphenylsiloxane copolymers, methylhydrosiloxane-dimethylsiloxane copolymers, polyalkylene oxide modified silicones, cyclic polysiloxanes of the D3, D4, and D5 types, and the like. Alternatively or in addition, any of the hydrophobizing agents discussed in connection with the composite particles themselves may be employed.

To form the organosilica particles, the polymer dispersion is diluted to about 5 wt % solids (e.g. surface agent+ polymer), for example, from about 0.1 wt % to about 20 wt %, for example from about 0.1 wt % to about 1 wt %, from about 1 wt % to about 5 wt %, from about 5 wt % to about 10 wt %, from about 10 wt % to about 15 wt %, or from about 15 wt % to about 20 wt %. The pH of the dispersion is adjusted to at least 8, for example, from 8 to 8.5, from 8.5 to 9, from 9 to 9.5, from 9.5 to 10, 10 to 10.5, from 10.5 to 11, from 11 to 11.5, from 11.5 to 12, or from 12 to 12.5, for example, by addition of ammonium hydroxide, e.g., 25-30 wt %, e.g. 28 wt %, in water. An at least partially hydrolyzed organosilane compound is added to the latex to form a mixture. The organosilane compound used as precursor to prepare organosilica may have the formula $R^1SiR^2_3$, as described herein in connection with the composite particle. The at least partially hydrolyzed organosilane compound may be obtained by dissolving the unhydrolyzed organosilane compound in water. The resulting solution, in which the organosilane compound has at least partially hydrolyzed, is added to the latex. The weight ratio of the organosilane compound (i.e., weight basis of unhydrolysed organosilane compound) with respect to the polymer may be from 0.1 to 2, for example, from 0.1 to 0.5, from 0.5 to 1, from 1 to 1.5, or from 1.5 to 2, depending on the desired organosilica/ polymer ratio. After the organosilane compound is allowed to react, additional reagent, for example, the same amount of organosilane compound as was added before, may be dissolved in water and added to the latex. It may take several hours, e.g., 1-4 hours, for the reaction to proceed to a desired extent. The reaction may be allowed to proceed at room temperature.

The aqueous dispersion of composite particles can be purified using any suitable technique. In an embodiment, the aqueous dispersion of composite particles can be purified by diafiltration. Alternatively or in addition, commercial polymer latices may be purified prior to preparation of the composite particles.

In this embodiment, the composite particles may be treated with a hydrophobizing agent as described herein in connection with the composite particle.

The composite particles may be used in dispersion or may be dried and used as a powder. Drying may be performed by any method known to those of skill in the art, e.g., spray drying or tray drying. The composite particles may be dried prior to hydrophobizing treatment or may be hydrophobized in dispersion.

Alternatively or in addition, an aqueous dispersion of the composite particles may be solvent exchanged to prepare a dispersion of the composite particles in another solvent, e.g., an organic solvent. Exemplary solvent exchange methods include diafiltration/ultrafiltration and addition of the solvent during evaporation of the aqueous solvent.

The invention further provides a toner composition comprising toner particles mixed with the inventive composite particles.

The composite particles may be used as external additives for both conventional and chemical toners. Conventional toners can be prepared by a number of known methods, such as admixing and heating a resin, pigment particles, optional charge enhancing additives and other additives in conventional melt extrusion devices and related equipment. Conventional equipment for dry blending of powders may be used for mixing or blending the carbon black particles with the resin. Other methods include spray drying and the like. Compounding of the pigment and other ingredients with the resin is generally followed by mechanical attrition and classification to provide toner particles having a desired particle size and particle size distribution. Chemical toners, also known as chemically prepared toners, are produced in a liquid phase; the resin particles are generally formed in the presence of the colorant. For example, a process has been developed in which polymer latex is combined with aqueous pigment dispersion and agglomerated using a coagulant to form polymer particles. Another process involves the aqueous suspension polymerization of a dispersion of pigment in at least one monomer. Also, a pigment/polyester resin dispersion has been prepared and combined with water, followed by evaporation of the solvent.

The composite particles may be spray-dried or the liquid phase simply evaporated to recover a powder that may be combined with toner particles to prepare a toner composition. Alternatively, the resulting particles may be combined with toner particles by a wet blending method. For example, toner may be sonicated with a dispersion of the composite particles until a well-mixed dispersion is obtained, for example, for about one hour. In one embodiment, the solids (toner plus additive particles) may make up about 55 wt %, for example, about 50 wt % to about 60 wt %, of the dispersion. The mixture should then be vortexed, for example, for five minutes at the highest speed on the Vortex Genie 2 vortex mixer from Scientific Instruments. The resulting dispersion is poured in a thin layer in a Pyrex glass pan (for 130 g dispersion, about a 2 L pan is appropriate) and allowed to dry at room temperature, for example, for about 48 hours, in a fume hood with good ventilation, e.g., about 80 ft/min, until the moisture content is less than about 2 wt %. Of course, a longer or shorter drying time may be required depending on how wet the toner is. Once dry, the toner particles having composite particles disposed about their surfaces may be collected.

In certain embodiments, the composite particles make up from about 0.5% to about 7% by weight of the toner composition, for example, from about 0.5% to about 1%, from about 1% to about 1.5%, from about 1.5% to about 2%, from about 2% to about 2.5%, from about 2.5% to about 3%, from about 3% to about 3.5%, from about 3.5% to about 4%, from about 4% to about 4.5%, from about 4.5% to about 5%, from about 5% to about 5.5%, from about 5.5% to about 6%, from about 6% to about 6.5% or from about 6.5% to about 7% by weight of the toner composition. The composite particles may be distributed on the surface of the toner particles. Preferably, surface coverage by the composite particles is about 10% to about 90% of the toner surface.

The composite particles may have sufficient mechanical strength to be mixed with toner particles according to methods typically used by those of skill in the art, for example, through use of a Henschel mixer or other fluidizing mixer or blender. For example, the composite particles may have sufficient strength to survive collisions between toner particles (having the composite particles distributed over the surface) during the development cycle of an electrophotographic process. The mechanical strength of the particles may be evaluated by formulating a chemical toner with the composite particles. The toner/particle formulation is then mixed with a carrier, e.g., silicone coated Cu—Zn ferrite carrier (60-90 μm particle size) to form a mixture with 2% (w/w) of toner. This mixture is then placed in a mixing container with a fill factor from about 70% to about 90% and tumbled in an agitator that can move the mixing container in a rhythmic, three-dimensional motion, termed a three-dimensional mixer. The mixing container is moved at a frequency from about 50 to about 70 cycles/min within a volume from about 6 to about 8 times the volume of the container. Exemplary agitators include the Turbula mixer, available from Willy A. Bachoven A G, the Inversina mixer, available from Bioengineering AG, and the dynaMix 3-dimensional mixer from Glen Mills. After a specified period of time, the samples are analyzed by SEM. In the Examples below, 40 g of carrier (silicone coated Cu—Zn ferrite carrier (60-90 μm particle size, Powdertech Co., Ltd.) was mixed with 0.8 g toner/additive formulation in a 50 mL glass jar. The jar was put in a TURBULA® T 2 F mixer (2 L capacity) manufactured by Willy A. Bachofen A G, Switzerland. In this mixer, the mixing container turns in a three-dimensional motion based on rotation, translation, and inversion and the content is subjected to an ever-changing, rhythmically pulsing motion (60 cycles/min). Small samples of the toner/carrier mixture were taken after 10, 30, and 60 min of mixing at 62 cycles/min and analyzed by SEM. If the composite particles have sufficient mechanical strength, they will not be flattened or deformed during the mixing. Any flattening or deformation will appear as a change in particle diameter in the SEM. In certain embodiments, the change in diameter of the composite particles after 10 minutes of mixing is less than 25%, for example less than 20% or less than 10%.

Many different particle types, sizes, surface chemistry, and structures or morphologies are used to modify the performance characteristics of liquid and solid polymer-based systems normally employed in adhesives, elastomers, coatings, composites, plastics, and other applications. Typically, particles are added into liquid polymer based systems (polymer solutions, dispersions, or molten polymers) and dispersed at a suitable stage in their formulation processes to improve their rheological properties or to improve the mechanical, optical, or electrical properties once the product has gone from its liquid processing form to its final solid product form either as a thermoplastic or thermoset after molding.

Depending on the polymer characteristics and final applications, equipment for adding particles include a variety of apparatus known in the art such as planetary mixers, kneaders, sigma-blade mixers, and other mixers for adhesives and thermoset composite formulations. Single and twin screw extruders, Buss kneaders, Farrell systems, and other mixers are especially suitable for molten thermoplastics and thermoplastic based composites (i.e., reinforced plastics) formulations. Banbury mixers, Brabender mixers, two and three roll mills, and other mixers are designed for elastomer formulations. Vertical or horizontal media mills, ball mills, and other mixing/grinding equipment are typically used for coatings formulations.

It is understood in the art that the amount of particles added, the extent and level of dispersion of particles in the polymer matrix, the interfacial adhesion of the particles with the polymer matrix, and the type, size, and morphology of particles are responsible for the changes in the rheological, mechanical, and optical properties of the systems with respect to the same systems without these particles. It is known, for instance, that the presence of 1 to 30% particles (w/w polymer) bearing the right size, dispersion, and surface chemistry for matrix affinity, in given systems, may change the rheological properties by several orders of magnitude and the mechanical properties by several fold.

Use of the composite particles disclosed herein can provide substantial advantages in a variety of applications, including in structural adhesives, coatings, thermoplastics, thermosets, pressure sensitive adhesives, and other engineering plastics.

The invention further provides a structural adhesive comprising the inventive composite particles.

In one implementation, the composite particles provided herein may be used in structural adhesives. Structural adhesives may be used to replace or augment conventional joining techniques such as welding or mechanical fasteners. To be suitable as structural adhesives, the adhesives are required to have high mechanical strength and impact resistance. However, traditional epoxy adhesives have low fracture toughness.

The inherent brittleness of heat-cured epoxy-based adhesives can be overcome by adding toughening agents which impart greater impact resistance to the cured epoxy compositions. Common techniques include the addition of elastomeric particles polymerized in situ in the epoxide from free-radical polymerizable monomers, the addition of a copolymeric stabilizer, the addition of elastomer molecules or separate elastomer precursor molecules, or the addition of core-shell polymers. In one implementation, the composite particles provided herein may be employed as toughening agents. Such composite particles may provide enhanced viscoelastic and mechanical properties such as but not limited to greater impact strength, flexural modulus, or stiffness without excessively increasing the viscosity of structural adhesive compositions.

The structural adhesive typically comprises a high molecular weight resin, an impact modifier and a curing agent for the resin. Exemplary resins include but are not limited to a high molecular weight epoxy resin such as a bisphenol A based liquid epoxy resin, EPN or ECN epoxy resin or an adduct of an epoxy resin and a carboxyl terminated rubber such as a carboxyl terminated nitrile rubber. The impact modifier preferably includes a composite particle as disclosed herein and may also include a core-shell polymer or a modified rubber such as a rubber modified epoxy.

An epoxy elastomer adduct may be used to impart flexibility to the structural adhesive and the ability to initiate plastic deformation. Various epoxy/elastomer adducts may be employed. The elastomer-containing adduct may be a combination of two or more particular adducts and the adducts may be solid adducts or semi-solids at a temperature of 23° C. or combinations thereof.

The adduct itself typically includes about 1:5 to 5:1 parts of epoxy to elastomer. The elastomer compound suitable for the adduct may be a thermosetting elastomer such as rubber, styrene-butadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. The elastomer-containing adduct is included to modify structural properties of the structural adhesive such as strength, toughness, stiffness, flexural modulus, and the like. Additionally, the elastomer-containing adduct may be selected to render the structural adhesive more compatible with coatings such as water-borne paint or primer systems or other conventional coatings.

A phenoxy resin may be used as the high molecular weight resin. Phenoxy resins are high molecular weight thermoplastic condensation products of bisphenol A and epichloro-hydrin and their derivatives. Examples of phenoxy resins that may be used are the products marketed by Inchem Corp. Examples of suitable materials are the PKHB, PKHC, PKHH, PKHJ, PKHP grade materials. Alternatively or in addition, phenoxy/polyester hybrids and epoxy/phenoxy hybrids may be used.

One or more curing agents and/or curing agent accelerators are typically included in the structural adhesive. The curing agents may assist the structural adhesive in curing by crosslinking of the polymers, phenoxy epoxy resins or both and any epoxy resin that may be present. The curing agents may also assist in thermosetting the structural adhesive.

The high molecular weight resin may also be or include an epoxy resin. An epoxy resin may be employed to produce the structural adhesive to increase the adhesion, flow properties, strength or stiffness of the material. One exemplary epoxy resin may be a phenolic resin, which may be a novolac type or other type resin. Other suitable epoxy containing materials include but are not limited to a bisphenol-A epichlorohydrin ether polymer, or a bisphenol-A epoxy resin which may be modified with butadiene or another polymeric additive or bisphenol-F-type epoxy resins.

The structural adhesive may contain other ingredients such as polymers, blowing agents, fillers, flow control materials, pigments, flame retardants, fibers, or moisture scavengers.

Depending upon the use to which the structural adhesive is to be put, it may include one or more additional polymers or copolymers which may contain functional groups, which can include a variety of different polymers, such as thermoplastics, elastomers, plastomers and combinations thereof or the like.

In certain implementations, it may be desirable to include one or more thermoplastic polyethers and/or thermoplastic epoxy resins in the structural adhesive. The thermoplastic polyethers typically include pendant hydroxyl moieties and/or aromatic ether/amine repeating units in their backbones. The thermoplastic polyethers may have a melt index between about 5 and about 100.

According to one implementation, the thermoplastic polyether is formed by reacting a primary amine, a bis(secondary)diamine, a cyclic diamine, a combination thereof or the like with a diglycidyl ether or by reacting an amine with an epoxy-functionalized poly(alkylene oxide) to form a poly(amino ether). According to another implementation, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties.

Additionally, it is contemplated that amines with one reactive group may be employed for forming the thermoplastic polyether. Advantageously, such amines may assist in controlling the molecular weight of the thermoplastic ether formed. Advantageously, the thermoplastic polyethers can provide the structural adhesive with various desirable characteristics such as desirable physical and chemical properties for a wide variety of applications.

The formulation may include one or more ethylene polymers or copolymers such as ethylene acrylate copolymers, ethylene vinyl acetate copolymers such as ethylene methacrylate and ethylene vinyl acetate.

It may also be desirable to include a reactive polyethylene resin that is modified with one or more reactive groups such as glycidyl methacrylate or maleic anhydride.

Both non-expandable and expandable structural adhesives are contemplated herein. If the uncured structural adhesive is expandable, one or more blowing agents may be added for producing inert gasses that form, as desired, an open and/or closed cellular structure within the structural adhesive. In this manner, it may be possible to lower the density of articles fabricated by using the structural adhesive.

The structural adhesive may also include one or more fillers, including but not limited to particulate materials, beads, microspheres such as Zeospheres available from Zeelan Industries, or the like. Examples of fillers that may be used include silica, diatomaceous earth, glass, clay, talc, pigments, colorants, glass beads or bubbles, glass, carbon or ceramic fibers, nylon or polyamide fibers, antioxidants, and the like.

It is contemplated that most nearly any additional chemicals, materials or otherwise may be added to the structural adhesive assuming they are suitable for the chosen application of the structural adhesive.

Formation of the structural adhesive can be accomplished according to a variety of new or known techniques. According to one implementation, the structural adhesive is formed by supplying the high molecular weight resin and the impact modifier in solid form such as pellets, chunks and the like and melt blending with the curing agent at a temperature below that at which the curing agent is activated. The fillers may then be added, followed by the curing agent and optionally any curing agent accelerator are added and mixed.

The invention also provides a coating composition comprising the inventive composite particles.

A variety of industries (e.g. automotive OEM, industrial) incorporate polymers in various coatings that are used in those industries. For example, in the automotive OEM industry, the coating system (i.e., finish) that is applied onto an automobile or truck body typically comprises an electrodepositable coating layer, a primer surface layer deposited onto at least a portion of the electrodepositable coating layer, at least one pigmented basecoat layer deposited onto at least a portion of the primer surfacer layer, and a clear coat layer deposited onto at least a portion of the basecoat layer. Each of these layers result from a coating composition which utilizes polymers as the main film forming component of the coating composition. Polymers, as well as additives, used in the coatings can vary depending on the type of coating and needs of the user. Coating properties may also vary depending on the type of polymer(s) and/or additives used.

An exemplary coating incorporating composite particles also comprises a carrier. The carrier can be any compound that chemically or physically locks the composite particles to each other and/or to a substrate. In some embodiments, suitable carriers can comprise, for example, any suitable resin or polymer. A resin or polymer, as used herein, is any of a class of solid or semi-solid organic products of natural or synthetic origin, generally of high or indefinite molecular weight with no definite melting point.

Examples of suitable resins include, but are not limited to, polyalkenes (such as polyethylene and polypropylene), phenolic resins, polyanhydrides, polyesters, epoxies, polyurethanes, cellulosics, alkyds, acrylics, polyolefins, polyolefin elastomers (such as ethylene propylene rubbers (EPR or EPDM), ethylene vinyl acetate (EVA), styrene-block copolymers (SBCs), and poly vinyl chloride (PVC), polyamides, vinyl polymers, synthetic rubbers (such as polyisoprene, polybutadiene, polychloroprene, and polyisobutylene), natural rubbers, natural rubber latexes and copolymers, and random copolymers, block copolymers, alternating copolymers, graft copolymers, comb/brush copolymers, dendrimers, mixtures of oligomers and precursors thereof.

The carrier may further include at least one dispersant. Examples of suitable dispersants include, but are not limited to, polyalkylene oxides, polyesters, polyamides, polyacrylates, and block copolymers having both a hydrophobic and a hydrophilic group. Additional examples include amine-functionalized derivatives or acid functionalized derivatives of these.

Specific dispersants can be chosen based on the composition of the composite particle used and the desired overall properties of the dispersion used in the coating formulation. Exemplary dispersants that may be employed include but are not limited to the OLOA series (modified polyisobutylene succinimides) from Chevron Chemical Co, DisperBYK108, DisperBYK 115, DisperBYK 116, DisperBYK 161, DisperBYK 163, DisperBYK 182, DisperBYK 2150 and DisperBYK 2050 dispersants, all available from BYK Chemic, Solsperse™ dispersants available from Noveon, including 27000, 32000, 32500, 35140, 38500, and 39000, and K-Sperse™ dispersants such as K-Sperse 504XD dispersant from King Industries.

In some embodiments, at least a portion of the composite particles are accessible to a surface of the coating. The coating can comprise any suitable amount of the composite particles. The coating can comprise about 0.1 wt. % or more, about 0.5 wt. % or more, about 1 wt. % or more, about 5 wt. % or more, about 10 wt. % or more of the composite particles. Alternatively, or in addition, the coating can comprise about 98 wt. % or less, about 95 wt. % or less, about 90 wt. % or less, about 85 wt. % or less, about 80 wt. % or less, about 75 wt. % or less of the composite particles. Thus, the carrier can comprise an amount of the composite particles bounded by any two of the aforementioned endpoints. For example, the carrier can comprise 0.05 wt. % to about 95 wt. %, about 0.1 wt. % to about 90 wt. %, about 0.5 wt. % to about 90 wt. %, about 1 wt % to about 80 wt. %, or about 10 wt. % to about 70 wt. % of the composite particles.

A coating composition for use in producing coatings incorporating composite particles includes the particles as provided herein, a carrier or carrier precursor, and any other component or components suitable in the preparation of a coating composition. For example, in some embodiments, the coating composition comprises a vehicle such as an organic solvent, mixtures of organic solvents and water, or water.

In some embodiments, the coating composition comprises at least one carrier precursor, e.g., a polymerizable monomer, curable resin, prepolymer, oligomer, or any other precursor which is further polymerized or reacted in the course of transforming the coating composition to a coating. In some embodiments, the coating composition comprises at least one polymerizable monomer, and the at least one polymerizable monomer is polymerized to form the carrier. The carrier precursor may include any curable resin known in the art. Exemplary cured resins include but are not limited to phenolic resins, acrylic resins, methacrylic resins, polystyrene resins, styrene-acrylic resins, poly vinyl butyral, urethane resins, or polyolefin resins. The curable resin is one that may be cured thermally or by any source of radiation. Likewise, polymers, oligomers, and monomers in the coating composition may be thermally or radiation polymerizable or cross-linkable. Prepolymers for polyurethanes and polyureas, such as hydroxyl-, amine-, or isocyanate-terminated oligomers, may also be employed. In this way, the coating composition may be photosensitive or thermosensitive. When the components of the coating composition are curable by irradiation, the coating composition may further comprise a photoinitiator.

The curable resin, prepolymer, polymer, monomer, or oligomer may be chosen to be compatible (i.e., form a one-phase combination) with the other materials of the coating composition. A solubility parameter can be used to indicate compatibility, as discussed in *Polymer Handbook*, J. Brandrup, ed., pp. VII 519-557 (1989), incorporated herein by reference.

The coating composition can further include any of a variety of components that are known in the art to be suitable for incorporation into a surface coating composition. Such components include colorants, pigments, UV stabilizers, coalescing agents, flow additives, defoamers, surfactants, rust inhibitors, biocides and antimicrobial agents, charge control agents, and the like.

A coalescing agent promotes the softening of the resin during drying of the components of the coating composition, and such materials are well known. Examples of coalescing agents include but are not limited to ethylene glycol butyl ether (available as Eastman EG from Eastman Chemical Company, Kingsport, Tenn.) and dipropylene glycol normal butyl ether (available as Arcosolv DPNB solvent from LyondellBasell, Houston, Tex.).

A flow additive promotes the wetting of the substrate by the coating composition and the levelling of the coating composition on the substrate. Typical flow additives include BYK 301 and BYK 346 materials from BYK-Chemie (Germany).

A defoamer can be utilized to reduce the presence of bubbles in the coating composition upon mixing of the components. Any suitable defoamer can be used in the coating composition. An example of a suitable defoamer is BYK 035 (BYK-Chemie, Germany).

A surfactant can be utilized to reduce the surface tension of the coating composition. Any suitable surfactant can be used in the coating composition. An example of a suitable surfactant is SURFYNOL 104 BC (Air Products & Chemicals, Inc.).

If the coating composition is applied to surfaces vulnerable to corrosion, a rust inhibitor can be utilized in the coating composition. A variety of rust inhibitors are suitable for use in the coating composition. An example of a suitable rust inhibitor is ammonium benzoate.

A charge control agent can be utilized to control the charge or stability of the composite particles within the coating composition. Any suitable charge control agent can be used in the coating composition. Examples of suitable charge control agents include polyisobutylene succinimide, tetraoctyl ammonium bromide, and the like.

The coating composition can be prepared in any suitable manner, for example, by combining composite particles with the carrier or carrier precursor, as well as with other components of the coating composition (e.g., dispersant(s), vehicle(s), colorant(s), pigment(s), coalescing agent(s), flow additive(s), defoamer(s), surfactant(s), rust inhibitor(s), charge control agent(s), and the like), by any suitable methods, many of which are well known in the art. For example, the composite particles can be added to a mixture of the carrier or carrier precursor and a suitable vehicle and then dispersed therein using any suitable means. Alternatively, the composite particles can be added to a vehicle and then dispersed therein, with the carrier or carrier precursor added thereafter. In other embodiments, the composite particles can be added to the carrier or carrier precursor and dispersed directly therein without use of a vehicle. Additional components such as described herein can be added at any suitable stage in the preparation of the coating composition.

The composite particles may be dispersed in the vehicle using any method known in the art. For example, the composite particles and a solvent may be combined with agitation to produce a stable dispersion, and, if used, a dispersant may be added. Also, if the composite particles are dispersible in water, the aqueous solvent of this dispersion may be exchanged for another solvent, e.g., an organic solvent. Alternatively, if a dispersant is used, this can be combined with the particle, and the resulting combination can then be combined with the solvent. The composite particles, dispersant, and solvent may be combined in any equipment known in the art, such as a media or ball mill, or other high shear mixing equipment, such as a rotor-stator mixer.

The coating composition can be applied to at least a portion of the article using any suitable method. For example, the coating composition can be applied by painting, dip coating, spraying, microgravure printing, spin coating, gravure coating, web coating, casting slit coating, slot coating, or other suitable techniques.

The invention further provides a pressure-sensitive adhesive comprising the inventive composite particles.

Pressure-sensitive adhesives (PSAs) form a bond by the application of light pressure to bond the adhesive with the adherend. PSAs are designed with a balance between flow and resistance to flow. The bond forms because the adhesive is soft enough to flow, or wet, the adherend. The bond has strength because the adhesive is strong enough to resist flow when stress is applied to the bond. Once the adhesive and the adherend are in proximity, there are also molecular interactions such as van der Waals forces involved in the bond, which contribute significantly to the ultimate bond strength. PSAs exhibit viscoelastic (viscous and elastic) properties, both of which are used for proper bonding.

PSAs are usually based on a resin compounded with a suitable tackifier (e.g., a rosin ester). The resin can include acrylics, butyl rubber, ethylene-vinyl acetate with high vinyl acetate content, natural rubber, nitriles, silicone rubbers, styrene block copolymers (also called styrene copolymer adhesives), styrene-butadiene-styrene (used in high-strength PSA applications), styrene-ethylene/butylene-styrene (used in low self-adhering non-woven applications), styrene-ethylene/propylene, styrene-isoprene-styrene (used in low-viscosity high-tack PSA applications), and vinyl ethers.

The composite particles provided herein may be incorporated into PSAs at any suitable loading level, for example, up to 10 wt % in the dry film. The composite particles may be hydrophobized or otherwise surface treated as described herein to improve the compatibility of the particles with the components of the PSA or their dispersibility in the liquid precursors that are used to formulate the PSA and which may be aqueous or organic, as is well known in the art. For instance, a dispersion of the composite particles could be added to a dispersion of the resin and mixed. Note the continuous phase of the dispersions could be aqueous or organic, depending upon the type of resin used. When the resulting mixed dispersion is sprayed, brushed, drawn or otherwise applied to a substrate, an adhesive film comprised of the resin particles and the composite particles is formed. This adhesive film is formed via a number of processes, including, but not limited to, the evaporation of the aqueous or organic solvent, and the coalescence of the resin and composite particles into a now dry pressure sensitive adhesive film.

The invention further provides thermoplastic and thermoset compositions containing the composite particles.

A thermoplastic is a plastic that softens when heated and hardens again when cooled. Thermoplastics can generally go through many melt/freeze cycles with no appreciable chemical change, making them suitable for recycling. These characteristics also lend thermoplastics to various manufacturing techniques, injection molding, thermoforming and welding.

Many thermoplastic materials are addition polymers (chain growth polymers), such as polyethylene and polypropylene. Thermoplastic polymers are contrasted with thermosetting polymers, which cannot go through melt/freeze cycles.

The possibility of improving the impact strength of thermoplastic polymers by incorporating mineral inclusions, of a chosen size and concentration, in a matrix is also known. For a given thermoplastic, it is found that there is a compromise between the impact strength and the modulus, one of these generally being improved to the detriment of the other. Use of the metal oxide-polymer composite particles provided herein can overcome this tradeoff. For example, thermoplastic polymers may be produced with up to 5% percent by weight of composite particles.

The matrix can consist of a thermoplastic polymer or copolymer or a thermoplastic containing a thermoplastic polymer or copolymer. It may consist of a blend of polymers or copolymers, these possibly being compatibilized by modification, using grafting or using compatibilizers.

Exemplary thermoplastics include but are not limited to polyolefins, polyamides, polyurethanes, polyesters, polycarbonates, polyacetals, acrylic and methacrylic polymers, styrene polymers, vinyl polymers, polymer and copolymer blends based on these polymers, and polyvinyl chloride. The thermoplastic matrix or compound may also contain additional fillers and reinforcements and functional additives known to those of skill in the art.

Thermoplastics may be prepared with dry composite particles by compounding them with polymer melts such as ABS, PC, PMMA, in typical thermoplastic compounding equipment such as a Brabender mixer, single screw extruder and twin screw extruder at recommended processing conditions for this plastic (T, mixing time).

Thermosets may be produced with dry composite particles or dispersions using the same methods as described herein for adhesives and coatings.

The following examples further illustrate the invention but, of course, should not be construed as in any way limiting its scope.

Example 1

This example demonstrates the preparation of a polyester latex in accordance with an embodiment of the invention.

To a 500 mL round bottom flask with overhead stirrer and thermocouple was added 50 g polyester resin (Reichold Fine-tone T-6694 resin, acid number 13 mg KOH/g resin, Tg=50-60° C.), 25 g methyl ethyl ketone, and 6.25 g isopropyl alcohol. The mixture was stirred at 250 rpm and maintained at 45° C. for 3 hours, after which 2.17 g 10% ammonium hydroxide solution (13.6 mmol) was added slowly. The mixture was stirred for a further five minutes, after which 5 g methacryloxypropyl-trimethoxysilane (MPS) was added. This mixture was stirred for 10 minutes, after which 150 g deionized water was slowly added to produce a dispersion. The mixture was heated to 95-98° C. and about 40 g liquid was distilled off. The heating mantle was removed and the reaction mixture cooled to room temperature.

Example 2

This example demonstrates the formation of organosilica-polyester composite particles in accordance with an embodiment of the invention.

Figure 1:
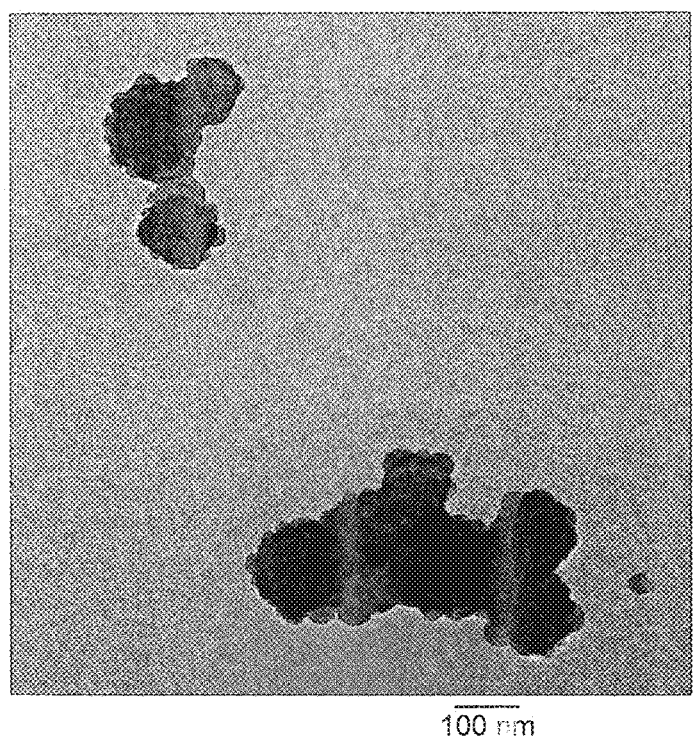
FIG. 1 is a transmission electron micrograph of composite particles described in Example 2 according to an embodiment of the invention.
Figure 2A:
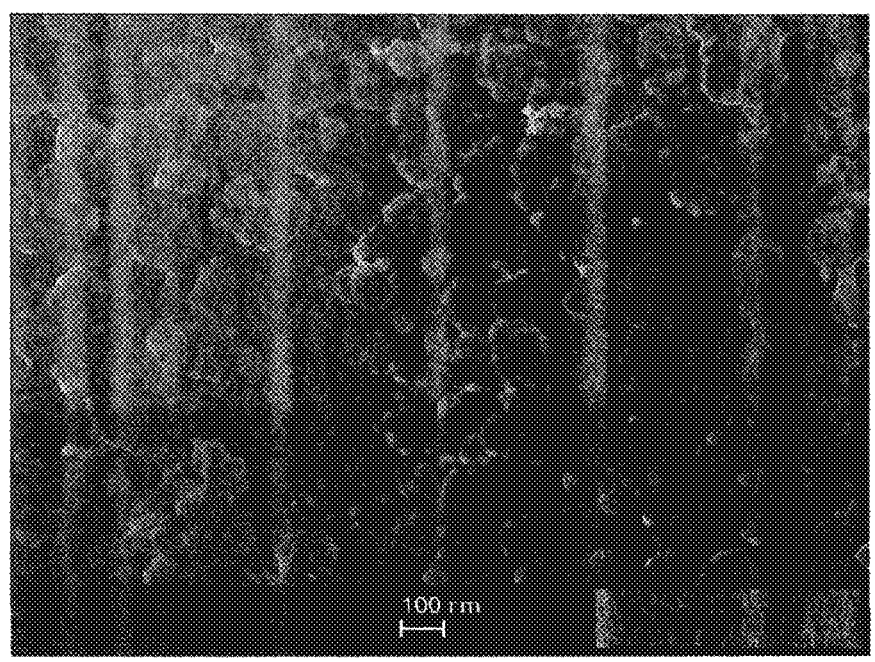
FIG. 2A is a scanning electron micrograph of composite particles described in Example 2 according to an embodiment of the invention.
Figure 2B:
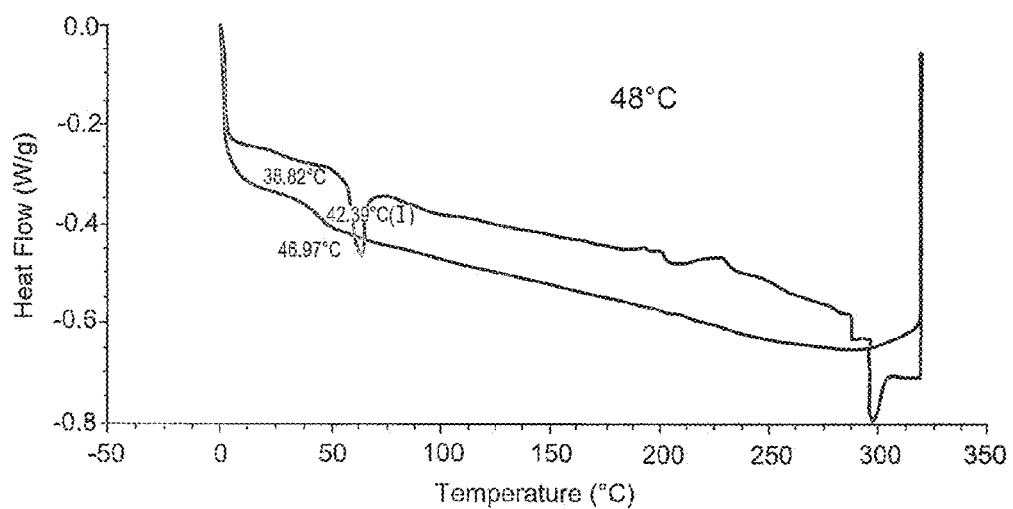
FIG. 2B is a differential scanning calorimetry profile of the composite particles shown in FIG. 2A.

38 g of the latex from Example 1 (26.4 wt % polyester+MPS) was diluted with 162 g deionized water to form a 5 wt % dispersion. 5 g of vinyltrimethoxysilane (VTMS, MW 148, 34 mmol) was dissolved in 25 g deionized water and stirred with a magnetic stir bar (300 rpm) for ~60 min until the organic droplets were completely dissolved and a transparent solution was obtained. 1 g of 30% ammonium hydroxide solution (MW=34) was added to the diluted latex dispersion and mechanically stirred for 5 min. The VTMS solution was added over one minute and the reaction allowed to proceed for 3 hours at room temperature. A second solution of VTMS, identical to the first, was prepared and added to the reaction mixture, and the reaction was allowed to proceed for an additional 3 hours. Transmission electron microscopy of the resulting particle dispersion is shown in FIG. 1. The resulting composite particles were recovered by evaporation of the solvent at room temperature. Scanning electron microscopy of the resulting powder is shown in FIG. 2A, the thermal profile measured by differential scanning calorimetry (DSC) is shown in FIG. 2B.

Example 3

This example demonstrates formation of organosilica-polyester composite particles in accordance with an embodiment of the invention.

The latex of Example 1 was prepared without addition of MPS to the polymer/solvent solution. Rather, 1 g of MPS was added to 40 g of the latex (about 25 wt % polymer) and stirred for 2 hours until the MPS droplets disappeared. Then, 160 g deionized water was added to dilute the dispersion to 5 wt % polymer. A VTMS solution was prepared as in Example 2. 1 g of 30% ammonium hydroxide solution (MW=34) was added to the diluted latex dispersion and mechanically stirred for 5 min. The VTMS solution was added over one minute and the reaction allowed to proceed for 3 hours at room temperature. A second solution of VTMS, identical to the first, was prepared and added to the reaction mixture, and the reaction was allowed to proceed for an additional 5 hours. The resulting composite particles were recovered by evaporation of the solvent at room temperature.

Example 4

This example demonstrates preparation of toner in accordance with an embodiment of the invention.

Figure 3A:
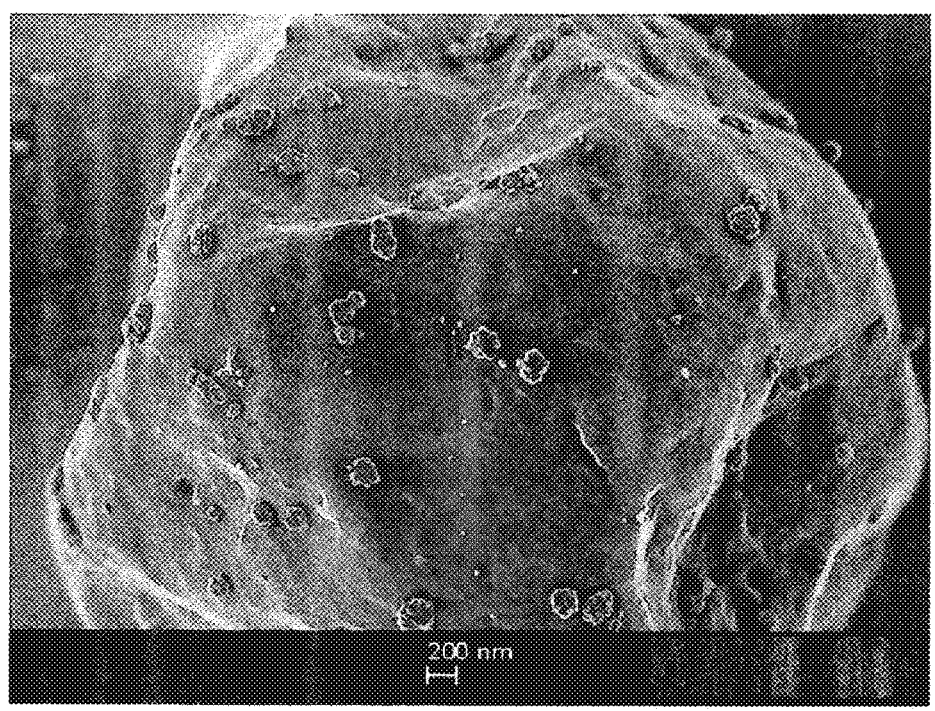
FIGS. 3A and 3B are scanning electron micrographs with indicated scales of 200 nm (FIG. 3A) and 1 µm (FIG. 3B) of a mixture of polyester toner and composite particles described in Example 4 according to an embodiment of the invention.
Figure 3B:
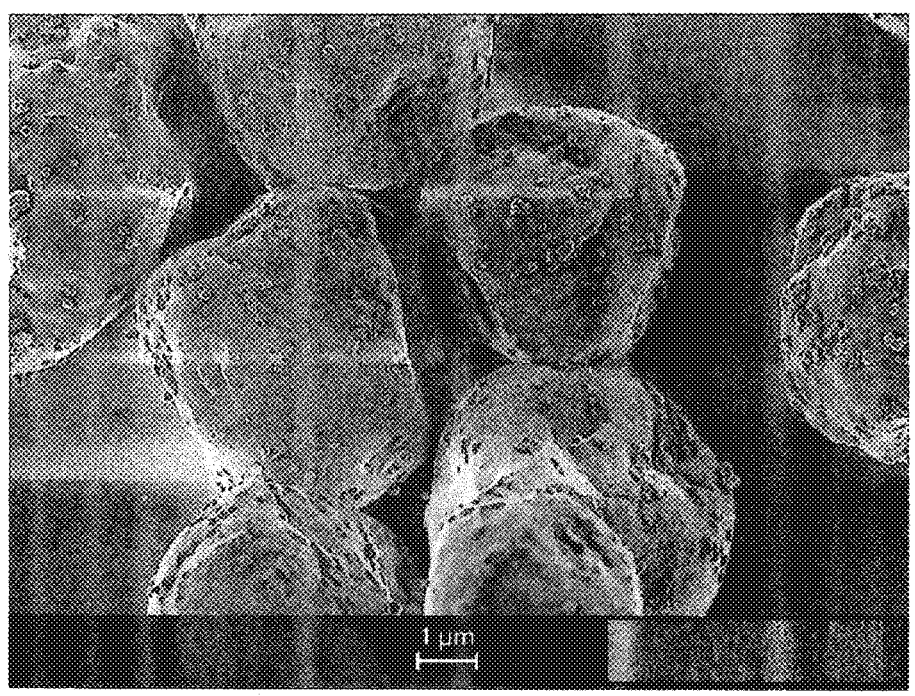

Chemical toner samples were formulated with 4 wt % of the composite particles of Example 2 and sufficient black polyester chemical toner (particle size 8-12 µm, supplied by Sinonar Inc.) to make an 80 g sample. The toner and additive were mixed in an IKA M20 Universal Mill (IKA Works, Inc., Wilmington, N.C.) for 45 s. The mill was operated in pulse mode (three cycles of 15 s mixer on and 15 s mixer off) to keep the toner from being heated above its glass transition temperature. Scanning electron micrographs of the resulting toner are shown in FIG. 3.

Example 5

This example demonstrates the tribocharge behavior of a toner comprising the inventive composite particles, in accordance with an embodiment of the invention.

Figure 4:
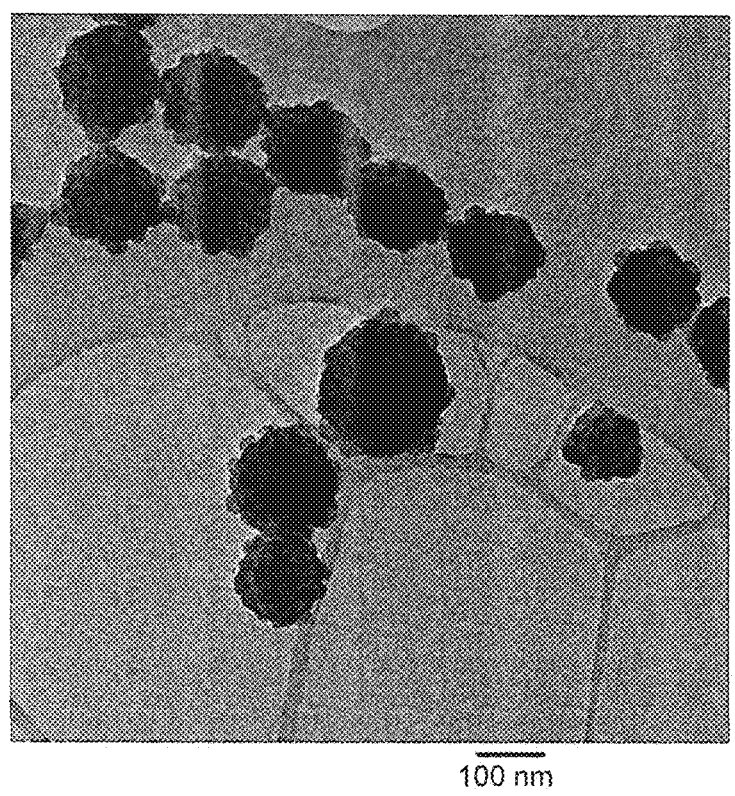
FIG. 4 is a transmission electron micrograph of composite particles described in Example 5 according to an embodiment of the invention.
Figure 5:
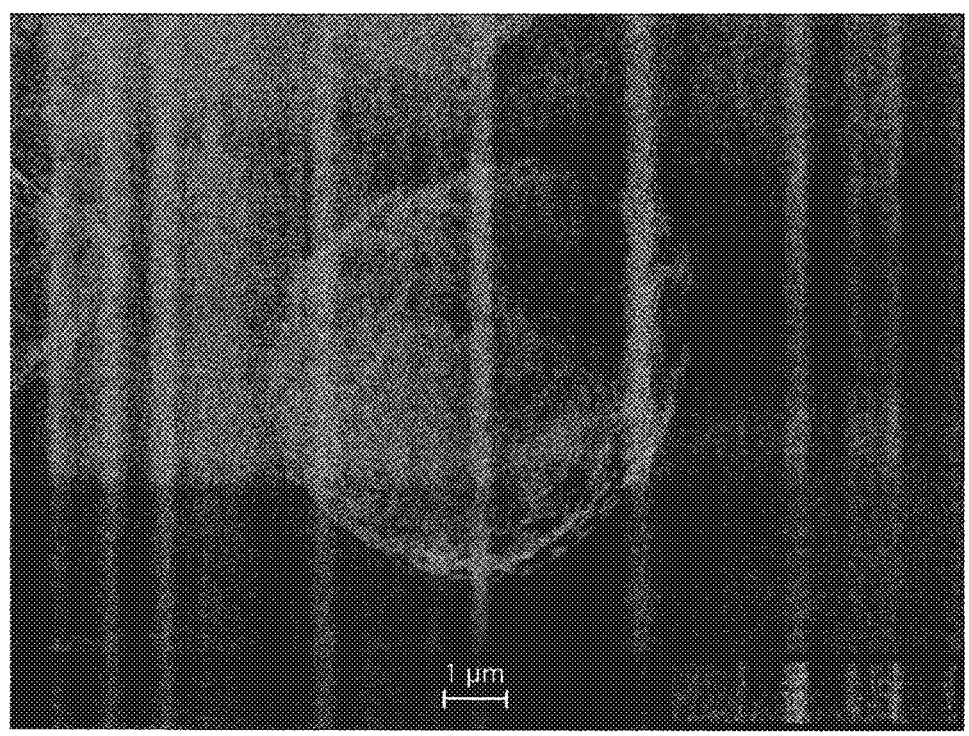
FIG. 5 is a scanning electron micrograph of a mixture of polyester toner and composite particles described in Example 5 according to an embodiment of the invention.

Composite particles were prepared according to Examples 1 and 2. The average particle size measured by the Microtrac Nanotrac™ 252 analyzer was 150 nm. TEM of the particles is shown in FIG. 4. The composite particles were formulated into chemical toner as described in Example 5. A scanning electron micrograph of the resulting toner is shown in FIG. 5. Developers were prepared by mixing 2 wt. % of formulated toner with a silicone resin coated Cu—Zn ferrite carrier (60-90 µm particle size, purchased from Powdertech Co., Ltd.). The developer was conditioned overnight in a temperature and humidity controlled chamber at 15% RH/18 C (LL condition) or 80% RH/30 C (HH condition). After conditioning, the developer was placed in a glass jar and charged by rolling for 30 min at 185 rpm on a roll mill. The triboelectrostatic charge measurement was done using a Vertex T-150 tribocharge tester, manufactured by Vertex Image Products, Inc., Yukon, Pa. The sample was placed inside a Faraday cage and a high pressure air jet was used to blow off the toner from the carrier. The carrier retained the opposing charge of the toner particles. The developer had a tribocharge of −71.9 µC/g at LL conditions and −12.8 µC/g at HH conditions, for a ratio of HH/LL of 0.18.

Example 6

This example demonstrates preparation of crosslinked polyester/MPS/organosilica particles in accordance with an embodiment of the invention.

200 grams of Fine-Tone T6694 polyester resin, 100 grams of 2-butanone (MEK) and 25 grams of isopropanol (IPA) were dissolved at 60° C. and stirred for about 2 hours. 8.68 grams of ammonium hydroxide ($NH_4OH$, 10 wt %) was added and stirred for 10 minutes, then 20 grams of MPS was added to the stirring solution and stirred for another 10 minutes. Next, 600 grams of deionized water was slowly dripped into the polyester solution over the course of 2-3 hours. The water immediately emulsified in the organic phase until a critical point was reached and the emulsion flipped to become an oil-in-water emulsion, at which point the viscosity of the dispersion dropped drastically. The final product had the consistency of water and was a milky white with a slight blue coloration around the edges.

A distillation receiver was set up with a connected reflux condenser to the stirring dispersion. The temperature was increased to 90° C., allowing the volatiles to be removed and collected in a Nalgene bottle for weight measurement. Distillation continued until just greater than 125 grams of solvent was collected (close to 130 grams) in order to be sure all volatiles were removed. The particle size distribution was measured by dynamic light scattering (DLS) and was d10=103 nm, d50=134 nm, d90=185 nm.

Polymerization of Particles.

In a 500 mL 4 necked round bottom flask, 170.53 grams of stock particle dispersion (29.32 wt %) was combined with 29.47 grams of deionized water to bring to total weight to 200 grams. Next, 0.5 grams of azobisbutyronitrile (AIBN) was dissolved in ~6 grams of methanol. While the AIBN was dissolving, a stream of nitrogen gas was bubble through the stirring particle dispersion for about 20 minutes to remove any dissolved oxygen. The dispersion was then heated to 70° C. and the AIBN solution was added dropwise to the hot stirring dispersion. The polymerization was run for 15 hours in order to ensure completion. The particle size distribution was again measured by DLS and was d10=104 nm, d50=137 nm, d90=181 nm.

Organosilica Growth.

Figure 6A:
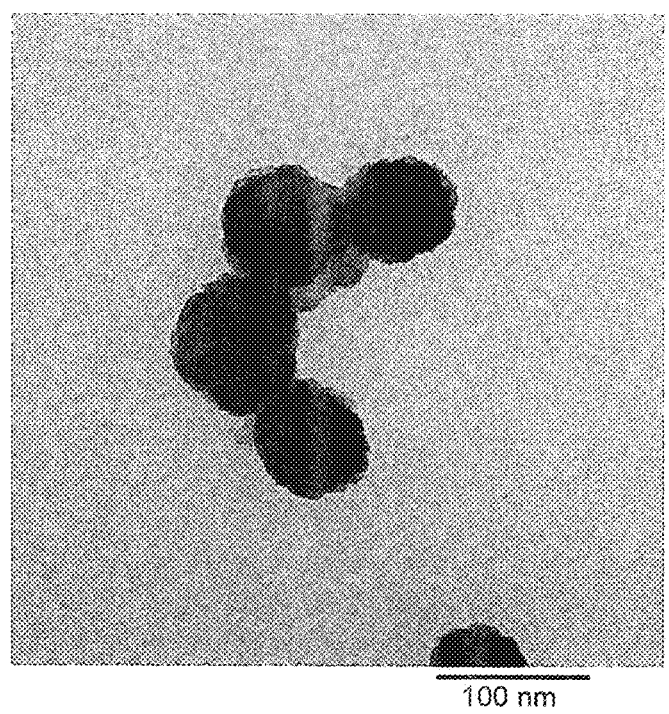
FIGS. 6A and 6B are two different transmission electron micrographs of composite particles described in Example 6 according to an embodiment of the invention.
Figure 6B:
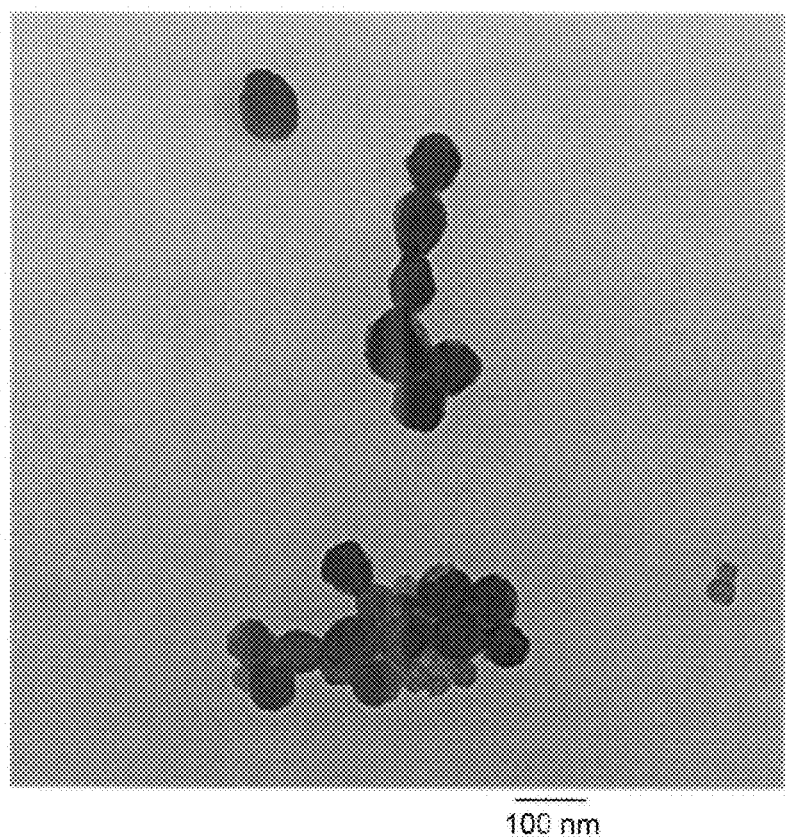
Figure 7:
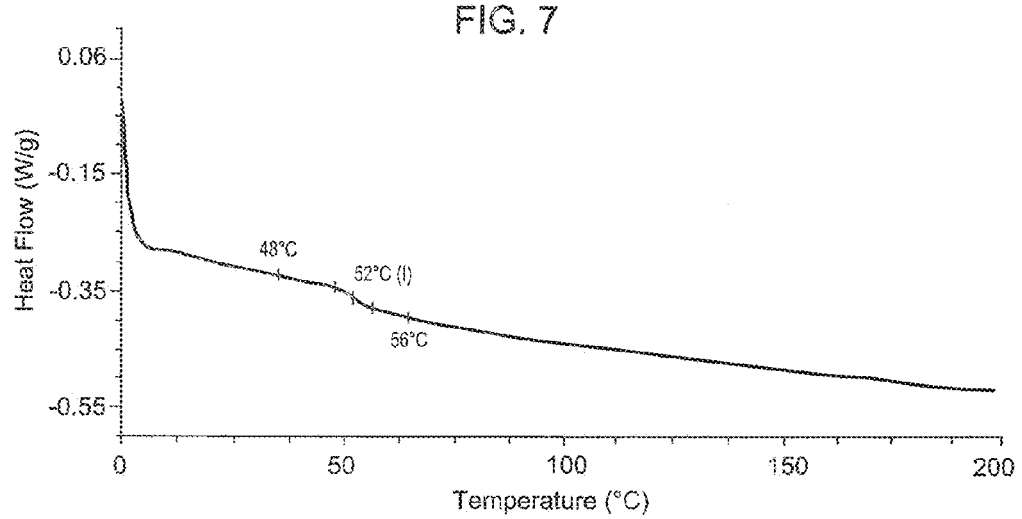
FIG. 7 is a thermal profile of the composite particles shown in FIG. 6 as measured by DSC.
Figure 8A:
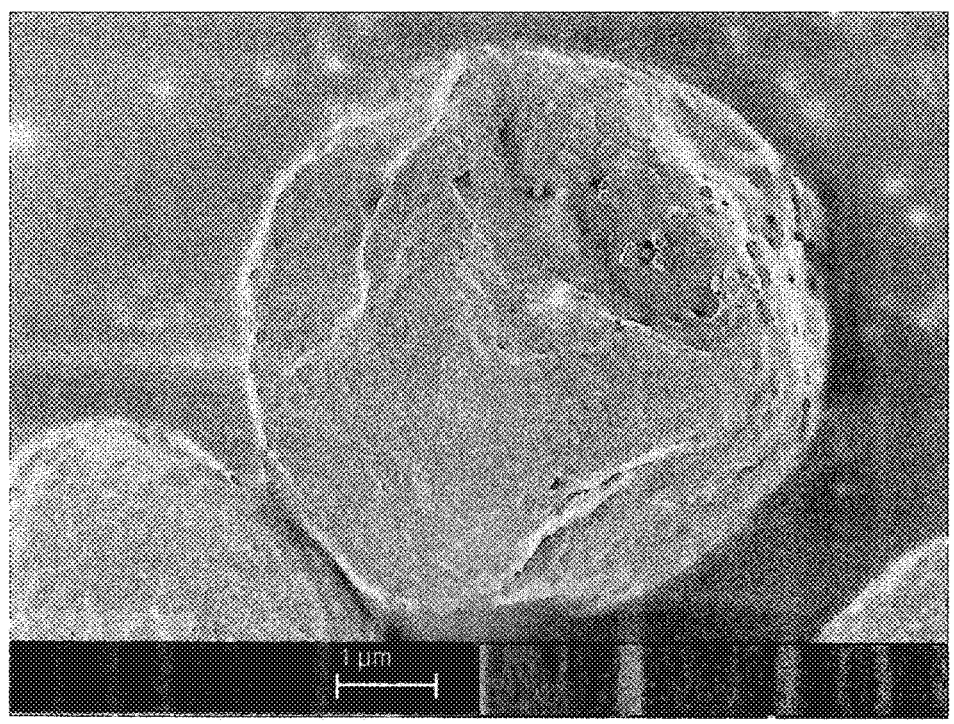
FIGS. 8A and 8B are scanning electron micrographs with indicated scales of 1 µm (FIG. 8A) and 200 nm (FIG. 8B) of the composite particles shown in FIG. 6.
Figure 8B:
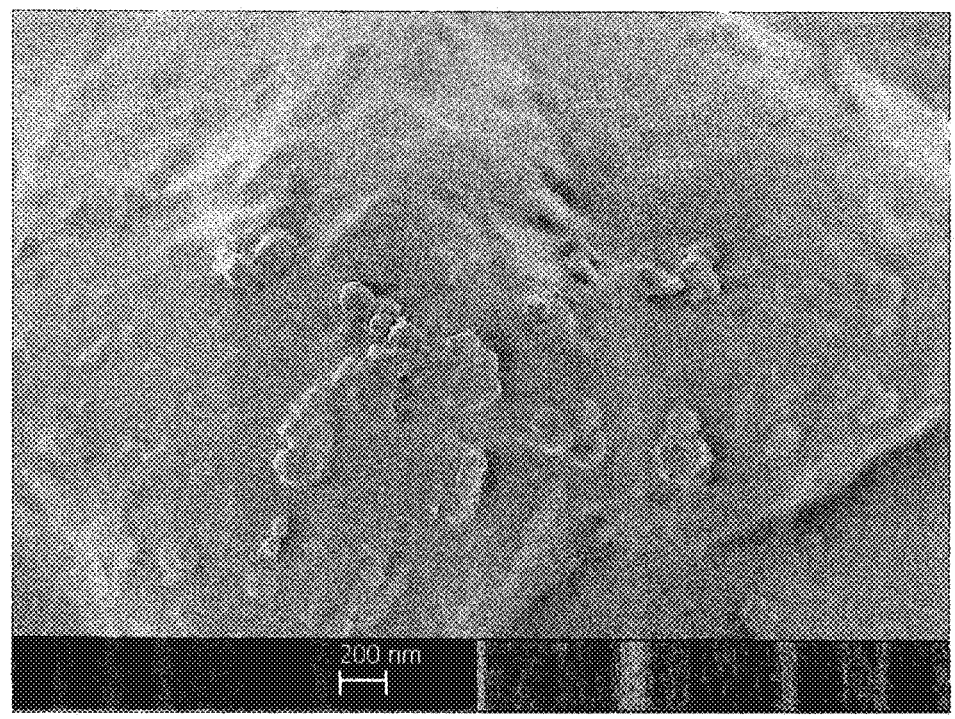

In a 30 mL Nalgene bottle containing a stirbar, 5 grams of vinyltrimethoxysilane (VTMS) was mixed with 25 grams of deionized water and stirred at room temperature for 60 minutes. Near the end of the hour, in a 1 Liter round bottom flask with a stirbar, 24.5 grams of stock polymerized particles (23.55 wt %) were mixed with 157.5 grams of deionized water followed by addition of 1 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 5 grams VTMS and 25 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size as measured by DLS was d10: 103.6 nm; d50: 156.7 nm, d90: 229.6 nm. Electron micrographs of the particles are shown in FIG. 6. The thermal profile of the material measured by DSC is shown in FIG. 7. Toner was prepared with the material as described in Example 4. Scanning electron micrographs of the resulting toner are shown in FIG. 8.

Additional particles were produced according to this method and analyzed by TEM and CP/CPMG/MAS $^{29}Si$ NMR. The roundness measured according to the method set forth in Example 11 was 1.31+/−0.17. The NMR spectrum is shown in FIGS. 22 A and B. The ratio of T3/T2 units is 5.4:1, indicating the VTMS is 84% condensed.

Example 7

This example demonstrates preparation of crosslinked polyester/MPS/organosilica with 10 wt % styrene in accordance with an embodiment of the invention.

200 grams of Fine-Tone T6694 polyester resin, 100 grams of 2-butanone (MEK) and 25 grams of isopropanol (IPA) were dissolved at 60° C. and stirred for about 2 hours. 8.68 grams of ammonium hydroxide ($NH_4OH$, 10 wt %) was added and stirred for 10 minutes, then 20 grams of MPS was added to the stirring solution and stirred for another 10 minutes. Next, 600 grams of deionized water was slowly dripped into the polyester solution over the course of 2-3 hours. The water immediately emulsified in the organic phase until a critical point was reached and the emulsion inverted to become an oil-in-water emulsion, at which point the viscosity of the dispersion dropped drastically. The final product had the consistency of water was a milky white with a slight blue coloration around the edges.

A distillation receiver was set up with a connected reflux condenser to the stirring dispersion. The temperature was increased to 90° C., allowing the volatiles to be removed and collected in a Nalgene bottle for weight measurement. Distillation continued until just greater than 125 grams of solvent was collected (close to 130 grams) in order to be sure all volatiles were removed. The particle size distribution was measured by dynamic light scattering (DLS) and was d10=73.1 nm, d50=113.6 nm, d90=182.5 nm.

Diffusion of Styrene and Polymerization.

In a 500 mL 4 necked round bottom flask, 118 grams of stock particle dispersion (21.17 wt %) was combined with 132 grams of deionized water to bring to total weight to 250 grams. Oxygen was purged from the dispersion by bubbling nitrogen gas through the stirring mixture for 20 min. Next, 0.25 grams of azobisbutyronitrile (AIBN) was dissolved in ~2.5 grams of styrene by adding one drop of acetonitrile and vortexing vigorously. The styrene/AIBN solution was added dropwise to the stirring dispersion and then left stirring for 60 minutes at room temperature to allow the styrene to diffuse into the particles. After diffusion, the temperature was increased to 80° C. and the dispersion was polymerized for 6 hours. The particle size distribution was again measured by DLS and was d10=76.9 nm, d50=13.1 nm, d90=172.8 nm.

Organosilica Growth.

In a 30 mL Nalgene bottle containing a stirbar, 5 grams of vinyltrimethoxysilane (VTMS) was mixed with 25 grams of deionized water and stirred at room temperature for 60 minutes. Near the end of the hour, in a 1 liter round bottom flask with a stirbar, 100 grams of stock polymerized particles (10 wt %) were mixed with 100 grams of deionized water followed by addition of 1 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 5 grams VTMS and 25 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size distribution was again measured by DLS and was d10:77.2 nm; d50: 115.1 nm; d90: 184.0 nm.

Example 8

This example demonstrates preparation of crosslinked polyester/MPS/organosilica with 40% styrene in accordance with an embodiment of the invention.

150 grams of Fine-Tone T6694 polyester resin was dissolved in 75 grams of 2-butanone (MEK) and 18.75 grams of isopropanol (IPA) at 60° C. and stirred for about 2 hours. 6.5 grams of ammonium hydroxide ($NH_4OH$, 10 wt %) was added and stirred for 10 minutes, following which 15 grams of MPS was added to the stirring solution and left stirring for about five minutes. 60 grams of styrene was then added to the stirring solution and left stirring for an additional 5 minutes. Next, 450 grams of deionized water was slowly dripped into the polyester solution over the course of 2-3 hours. The water immediately emulsified in the organic phase until a critical point is reached and the emulsion flipped to become an oil-in-water emulsion, at which point the viscosity of the dispersion dropped drastically. The final product had the consistency of water and was a milky white with a slight blue coloration around the edges.

A distillation receiver was set up with a connected reflux condenser to the stirring dispersion. The temperature was increased to 90° C., allowing the volatiles to be removed and collected in a Nalgene bottle for weight measurement. Distillation continued until just about 100 grams of solvent was collected in order to be sure all volatiles were removed. The particle size distribution was measured by dynamic light scattering (DLS) and was d10=116.2 nm, d50=161.7 nm, d90=232.5 nm.

Polymerization: The dispersion was sparged with nitrogen gas for about 20 minutes. About 2 g AIBN was dissolved in methanol with the aid of 2-3 drops of acetonitrile. The sparged dispersion was brought to 80° C. and the initiator solution added dropwise. The dispersion was stirred for 6 hours, following which the heating mantle was turned off and the reaction allowed to proceed overnight at ambient temperature to produce a solution of polymerized particles.

Figure 9:
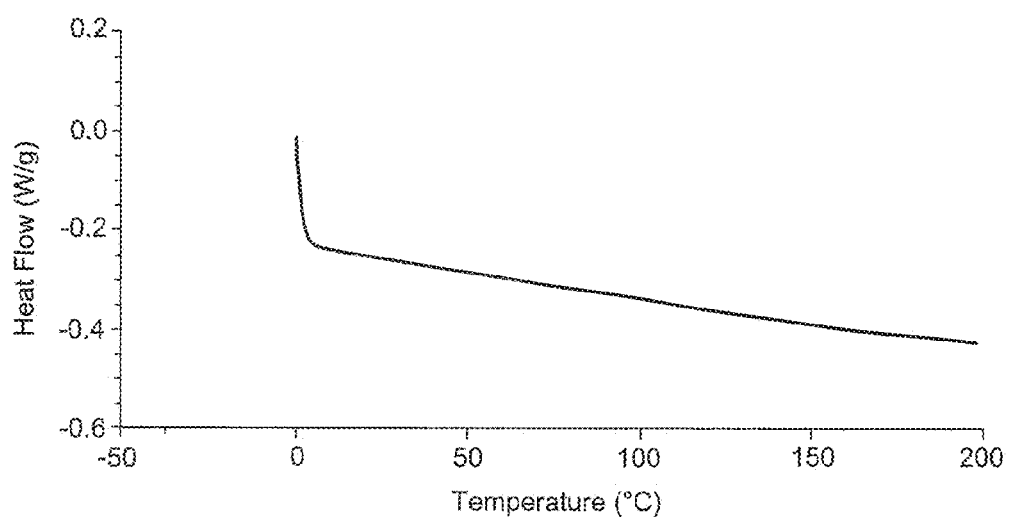
FIG. 9 is the DSC profile of composite particles described in Example 8 according to an embodiment of the invention.
Figure 10A:
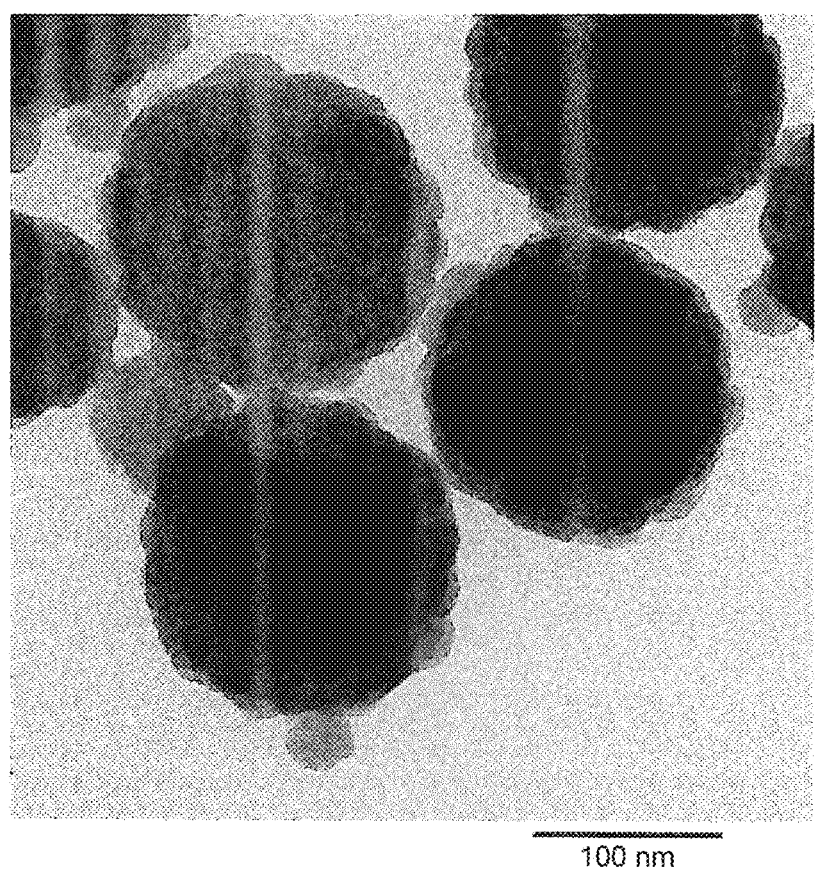
FIGS. 10A and 10B are SEM micrographs with different scales of composite particles described in Example 8 according to an embodiment of the invention.
Figure 10B:
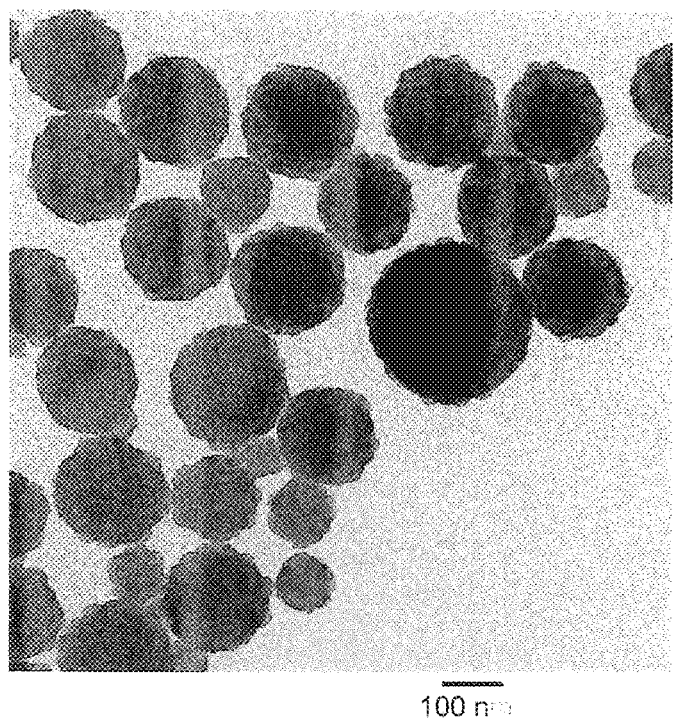

Organosilica growth. In a 500 mL Nalgene bottle containing a stirbar, 50 grams of vinyltrimethoxysilane (VTMS) was mixed with 250 grams of deionized water and stirred at room temperature for 60 minutes. Near the end of the hour, in a 3 liter round bottom flask with a stirbar, 347.38 grams of stock polymerized particles (28.77 wt %) were mixed with about 1500 grams of deionized water followed by addition of 10 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 50 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size distribution was again measured by DLS and was d10: 141.8 nm; d50: 202.7 nm; d90: 356.0 nm. DSC was performed on the particles and the resulting thermal profile is shown in FIG. 9. SEM micrographs of the particles are shown in FIG. 10.

The composite particles were formulated with toner as described in Example 4. 40 g of Cu—Zn ferrite carrier (60-90 μm particle size, purchased from Powdertech Co., Ltd.) was mixed with 0.8 g of the toner/particle formulation in a 50 mL glass jar. The jar was put in a TURBULA® T 2 F mixer manufactured by Willy A. Bachofen A G, Switzerland and agitated in a three-dimensional motion at 101 cycles/min. SEM micrographs of the toner before shaking and after shaking for 30 and 120 minutes are in FIG. 11.

Example 9

This example demonstrates preparation of composite particles with styrene-acrylate resin in accordance with an embodiment of the invention.

In a 500 mL Nalgene bottle containing a stirbar, 50 grams of vinyltrimethoxysilane (VTMS) was mixed with 250 grams of deionized water and stirred at room temperature for 60 minutes. Near the end of the hour, in a 2 Liter round bottom flask with a stirbar, 102 grams of stock Joncryl 631 (48.71 wt % from BASF) was mixed with 800 grams of deionized water followed by addition of 5 grams of 28% ammonium hydroxide ($NH_4OH$). The hydrolyzed VTMS solution was added dropwise over ~5 minutes to the stirring basic Joncryl dispersion and let stir for 3 hours. After 2 hours of stirring, a second batch of 50 grams VTMS and 250 grams of deionized water was set to stir for 60 minutes. The 3 hours and the 60 minutes stirring were ended approximately simultaneously. At this point, the second batch of hydrolyzed VTMS was added dropwise over-5 minutes to the stirring composite dispersion. The mixture was let stir for 3 hours to finish organosilica growth on the Joncryl particles. The particle size distribution was measured by DLS and was d10: 73.1 nm, d50=115 nm, d90=222 nm. The particle size distribution and an electron micrograph are shown in FIGS. 12A and B.

The dispersion was diafiltered using a GE Healthcare Hollow Fiber Cartridge (Model #UFP-500-E-4MA) with a 500,000 NMWC and a 420 cm² surface area, coupled to a Masterflex Easy Load II pump (Model #77200-60) using a Masterflex Standard Drive motor. The dispersion was pumped through the filter cartridge which caused water and dissolved ions to be removed. Deionized water was added to the dispersion as the liquid level decreased to replace the lost water. The dispersion was diafiltered until the measured conductance of the supernatant was <100 μs. 300 grams of the diafiltered composite particle dispersion (13.56 wt %) was heated to 70° C. and 6 grams of hexamethyldisilazane (HMDZ) was added to the stirring solution. The mixture was stirred overnight at 300 rpm for full treatment with HMDZ. The particle size distribution is shown in FIG. 12C and was d10=82.0 nm; d50=129.5 nm; d90=194.9 nm.

Example 10

This example demonstrates preparation of composite particles with styrene-acrylate resin in accordance with an embodiment of the invention.

In a 500 mL Nalgene bottle containing a stirbar, 25 grams of vinyltrimethoxysilane (VTMS) was mixed with 250 grams of deionized water and stirred at room temperature for 60 minutes. Near the end of the hour, in a 2 Liter round bottom flask with a stirbar, 102 grams of stock Joncryl 631 (48.71 wt % from BASF) was mixed with 800 grams of deionized water followed by addition of 5 grams of 28% ammonium hydroxide ($NH_4OH$). The hydrolyzed VTMS solution was added dropwise over ~5 minutes to the stirring basic Joncryl dispersion and let stir for 3 hours. After 2 hours of stirring, a second batch of 25 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was let stir for 3 hours to finish organosilica growth on the Joncryl particles. The particle size distribution was measured by DLS and was d10=80.1 nm; d50=120.5 nm; d90=180.1 nm. The DSC results and an electron micrograph are shown in FIGS. 13A and B.

Example 11

This example demonstrates preparation of composite particles in accordance with an embodiment of the invention.

In a 500 mL Nalgene bottle containing a stirbar, 50 grams of vinyltrimethoxysilane (VTMS) was mixed with 250 grams of deionized water and stirred at room temperature for 60 minutes. Near the end of the hour, in a 3 liter round bottom flask with a stirbar, 313 grams of stock polymerized particles (28.77 wt %) from Example 8 were mixed with about 1487 grams of deionized water followed by addition of 10 gram of 28% ammonium hydroxide ($NH_4OH$). The hydrolyzed VTMS solution was added dropwise over ~5 minutes to the stirring basic particle dispersion and left stirring for 3 hours. After 2 hours of stirring, a second batch of 50 grams VTMS and 250 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was left stirring for 3 hours to finish organosilica growth on the polymerized particles. The particle size distribution was again measured by DLS and was d10: 135.7 nm; d50: 194.8 nm; d90: 363 nm.

Roundness was determined by analysis of >500 particles dropped on a TEM grid. Centrifugation was sometimes used to clean up the sample prior to preparation. The particles were imaged on a JEOL 1200 operated at 80 kV. Image-Pro™ software from MediaCybernetics was used to analyze the images and calculate perimeter and area to calculate Roundness (Perimeter$^2$/(4$\pi$*Area)). The images required occasional editing to eliminate particles that were touching one another. The particle roundness was 1.21+/−0.08.

Example 12

This example demonstrates preparation of composite particles in accordance with an embodiment of the invention.

In a Nalgene bottle containing a stirbar, 100 grams of vinyltrimethoxysilane (VTMS) was mixed with 500 grams of deionized water and stirred at room temperature for 60 minutes. Near the end of the hour, in a round bottom flask with a stirbar, about 200 grams of stock Joncryl 631 (48.71 wt % from BASF) was mixed with 1800 grams of deionized water followed by addition of 10 grams of 28% ammonium hydroxide ($NH_4OH$). The hydrolyzed VTMS solution was added dropwise over ~5 minutes to the stirring basic Joncryl dispersion and let stir for 3 hours. After 2 hours of stirring, a second batch of 100 grams VTMS and 500 grams of deionized water was set to stir for 60 minutes. The 3 hours and the 60 minutes stirring were ended approximately simultaneously. At this point, the second batch of hydrolyzed VTMS was added dropwise over ~5 minutes to the stirring composite dispersion. The mixture was let stir for 3 hours to finish organosilica growth on the Joncryl particles. The particle size distribution was measured by DLS and was d10: 88.4 nm, d50=120.8 nm, d90=259.9 nm. Roundness was measured as described in Example 11 and was 1.36+/−0.15.

Example 13

This example demonstrates preparation of composite particles in accordance with an embodiment of the invention.

In a round bottom flask with overhead stirrer and thermocouple, 200 g polyester resin (Reichold Fine-tone T-6694 resin, acid number 13 mg KOH/g resin, Tg=50-60° C.) was combined with 100 g methyl ethyl ketone and 25 g isopropyl alcohol. The mixture was stirred at 60° C. for 2 hours, after which 8.68 g of 10% ammonium hydroxide solution was added slowly. The mixture was stirred for a further five minutes, after which 20 g methacryloxypropyl-trimethoxysilane (MPS) was added. This mixture was stirred for 10-15 minutes, after which 600 g deionized water was slowly added, producing a dispersion. The mixture was heated to 93° C. and to distill off the volatile components. The heating mantle was removed and the reaction mixture cooled to room temperature.

Organosilica growth: 381.4 g of the latex from Example 1 (26.2 wt % polyester+MPS) was diluted with 1618.61 g deionized water to form a 5 wt % dispersion. 50 g of VTMS was allowed to hydrolyze in 250 g deionized water for one hour, following which 10 g of 30 wt % ammonium hydroxide was slowly added and the solution allowed to stir for five minutes. The VTMS solution was added to the latex over five minutes, and the reaction was allowed to proceed at 3 hours at room temperature. A second solution of VTMS, identical to the first, was prepared and added to the reaction mixture. The reaction was allowed to proceed for an additional 3 hours. The particle size distribution of the resulting particles was d10=177.9 nm, d50=243.5 nm, and d90=343 nm. Additional particles were produced according to the methods of this Example, and their roundness measured according to Example 11 was 1.43+/−0.18.

Example 14

This example demonstrates the preparation of composite particles from combining Finetone-MPS particles, polyurethane particles (R4289 polyurethane dispersion from Essential Industries), or polyurethane (Neorez R551 polyurethane from DSM Resins) particles with vinyltrimethoxysilane, allyltrimethoxysilane, trimethoxymethylsilane, or trimethoxypropylsilane.

Silica Growth on Finetone/MPS Particles
VTMS as Silane Compound 38 g of the latex from Example 1 (26.4 wt % polyester+MPS) was diluted with 162 g deionized water to form a 5 wt % dispersion. 5 g of vinyltrimethoxysilane (VTMS, MW 148, 34 mmol) was dissolved in 12.5 g deionized water and stirred with a magnetic stir bar (300 rpm) for ~60 min until the organic droplets were completely dissolved and a transparent solution was obtained. 1 g of 30% ammonium hydroxide solution (MW=34) was added to the diluted latex dispersion and mechanically stirred for 5 min. The VTMS solution was added over one minute and the reaction allowed to proceed at 3 hours at room temperature. A second solution of VTMS, identical to the first, was prepared and added to the reaction mixture, and the reaction was allowed to proceed for an additional 3 hours.

ATMS as Silane Compound 19 g of the latex from Example 1 (26.4 wt % polyester+MPS) was diluted with 81 g deionized water to form a 5 wt % dispersion. 2.5 g of allyltrimethoxysilane (ATMS, MW 162, 13 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The ATMS solution was added over one minute and the reaction allowed to proceed at 3 hours at room temperature. A second solution of ATMS, identical to the first, was prepared and added to the reaction mixture, and the reaction was allowed to proceed for an additional 3 hours.

TMMS as Silane Compound 19 g of the latex from Example 1 (26.4 wt % polyester+MPS) was diluted with 81 g deionized water to form a 5 wt % dispersion. 2.5 g of trimethoxymethylsilane (TMMS, MW 136, 18.4 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMMS solution was added over one minute and the reaction allowed to proceed at 3 hours at room temperature. A second solution of TMMS, identical to the first, was prepared and added to the reaction mixture, and the reaction was allowed to proceed for an additional 3 hours.

TMPS as Silane Compound 19 g of the latex from Example 1 (26.4 wt % polyester+MPS) was diluted with 81 g deionized water to form a 5 wt % dispersion. 2.5 g of trimethoxy(propyl)silane (TMPS, MW 164, 15.3 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMPS solution was added over one minute and the reaction allowed to proceed at 3 hours at room temperature. A second solution of TMPS, identical to the first, was prepared and added to the reaction mixture, and the reaction was allowed to proceed for an additional 3 hours.

Silica Growth on PU (SMPP157) Particles

VTMS as Silane Compound 15.6 g of the latex from polyurethane stock (R4289 dispersion, 32 wt % polyurethane) was diluted with 84.4 g deionized water to form a 5 wt % dispersion. 2.5 g of vinyltrimethoxysilane (VTMS, MW 148, 17 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The VTMS solution was added over one minute and the reaction allowed to proceed at 3 hours at room temperature. A second solution of VTMS, identical to the first, was prepared and added to the reaction mixture, and the reaction was allowed to proceed for an additional 3 hours.

ATMS as Silane Compound 15.6 g of the latex from polyurethane stock (R4289 dispersion, 32 wt % polyurethane) was diluted with 84.4 g deionized water to form a 5 wt % dispersion. 2.5 g of allyltrimethoxysilane (ATMS, MW 162, 15.5 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The ATMS solution was added over one minute and the reaction allowed to proceed at 3 hours at room temperature. A second solution of ATMS, identical to the first, was prepared and added to the reaction mixture, and the reaction was allowed to proceed for an additional 3 hours.

TMMS as Silane Compound 15.6 g of the latex from polyurethane stock (R4289 dispersion, 32 wt % polyurethane) was diluted with 84.4 g deionized water to form a 5 wt % dispersion. 2.5 g of trimethoxymethylsilane (TMMS, MW 136, 18.4 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMMS solution was added over one minute and the reaction allowed to proceed at 3 hours at room temperature. A second solution of TMMS, identical to the first, was prepared and added to the reaction mixture, and the reaction was allowed to proceed for an additional 3 hours.

TMPS as Silane Compound 15.6 g of the latex from polyurethane stock (R4289 dispersion, 32 wt % polyurethane) was diluted with 84.4 g deionized water to form a 5 wt % dispersion. 2.5 g of trimethoxy(propyl)silane (TMPS, MW 164, 15.3 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMPS solution was added over one minute and the reaction allowed to proceed at 3 hours at room temperature. A second solution of TMPS, identical to the first, was prepared and added to the reaction mixture, and the reaction was allowed to proceed for an additional 3 hours.

Silica Growth on PU (Neorez R551) Particles

VTMS as Silane Compound 14.6 g of the latex from polyurethane stock (Neorez R551 dispersion, 34.3 wt %/polyurethane) was diluted with 85.4 g deionized water to form a 5 wt % dispersion. 2.5 g of vinyltrimethoxysilane (VTMS, MW 148, 17 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The VTMS solution was added over one minute and the reaction allowed to proceed at 3 hours at room temperature. A second solution of VTMS, identical to the first, was prepared and added to the reaction mixture, and the reaction was allowed to proceed for an additional 3 hours.

ATMS as Silane Compound 14.6 g of the latex from polyurethane stock (Neorez R551 dispersion, 34.3 wt % polyurethane) was diluted with 85.4 g deionized water to form a 5 wt % dispersion. 2.5 g of allyltrimethoxysilane (ATMS, MW 162, 15.5 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The ATMS solution was added over one minute and the reaction allowed to proceed at 3 hours at room temperature. A second solution of ATMS, identical to the first, was prepared and added to the reaction mixture, and the reaction was allowed to proceed for an additional 3 hours.

TMMS as Silane Compound 14.6 g of the latex from polyurethane stock (Neorez R551 dispersion, 34.3 wt % polyurethane) was diluted with 85.4 g deionized water to form a 5 wt % dispersion. 2.5 g of trimethoxymethylsilane (TMMS, MW 136, 18.4 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMMS solution was added over one minute and the reaction allowed to proceed at 3 hours at room temperature. A second solution of TMMS, identical to the first, was prepared and added to the reaction mixture, and the reaction was allowed to proceed for an additional 3 hours.

TMPS as Silane Compound 14.6 g of the latex from polyurethane stock (Neorez R551 dispersion, 34.3 wt % polyurethane) was diluted with 85.4 g deionized water to form a 5 wt % dispersion. 2.5 g of trimethoxy(propyl)silane (TMPS, MW 164, 15.3 mmol) was dissolved in 12.5 g deionized water and stirred with a magnetic stir bar (300 rpm) for ~60 min until the organic droplets were completely dissolved and a transparent solution was obtained. 0.5 g of 30% ammonium hydroxide solution (MW=34) was added to the diluted latex dispersion and mechanically stirred for 5 min. The TMPS solution was added over one minute and the reaction allowed to proceed at 3 hours at room temperature. A second solution of TMPS, identical to the first, was prepared and added to the reaction mixture, and the reaction was allowed to proceed for an additional 3 hours.

The particle size distribution of representative composite particles described in this Example are set forth in Table 1. The particle sizes were determined by dynamic light scattering.

TABLE 1

| Silane | Base polymer* | d10 | d50 | d90 |
|---|---|---|---|---|
| VTMS | R4289 | 31.2 | 48.4 | 71.7 |
| TMMS | Finetone/MPS | 178 | 302 | 543 |
| ATMS | Finetone/MPS | 183 | 260 | 350 |
| TMPS | Finetone/MPS | 173 | 296 | 400 |
| TMMS | R4289 | 29 | 46 | 67 |
| TMPS | R4289 | 29 | 46 | 70 |
| ATMS | R4289 | 34 | 48 | 68.5 |
| VTMS | Neorez R551 | 19.9 | 30 | 47 |
| TMPS | Neorez R551 | 21 | 32 | 48.5 |
| ATMS | Neorez R551 | 24 | 34.7 | 47.8 |
| TMMS | Neorez R551 | 18.3 | 29.4 | 44.5 |
| Control | Neorez R551 | 10.4 | 16.2 | 36.6 |
| Control | R4289 | 24.2 | 40.6 | 65.6 |

*R4289 and Neorez R551 are polyurethane dispersions. Finetone/MPS is Finetone polyester treated with methacryloxypropyltrimethoxysilane.

Example 15

This example demonstrates use of the inventive composite particles in a pressure sensitive adhesive.

Three pressure-sensitive adhesives formulations were prepared, Formulation 15A (comparative), Formulation 15B (invention), and Formulation 15C (invention). Each of the formulations contained Rhobond PS 68 adhesive (Dow Chemical, Midland, Mich.) and sufficient water to adjust the resin content in the final dispersion to 41.6% weight resin. Formulations 15B and 15C further contained the composite particles as described in Example 12. The formulations are set forth in Table 2A.

TABLE 2A

| | Formulation | | |
|---|---|---|---|
| Formulation Component | 15A (control) | 15B (invention) | 15C (invention) |
| Rhobond PS 68 (g) (Note Rhobond PS 68 is 55% weight resin) | 45.35 | 45.35 | 45.35 |
| Aqueous dispersion of composite particles (g) (Note composite particles dispersion is 18.9% weight composite particles) | 0.00 | 6.90 | 14.65 |
| Water (g) | 14.65 | 7.75 | 0.00 |
| Total weight final dispersion (g) | 60.00 | 60.00 | 60.00 |
| % weight resin in final dispersion | 41.6 | 41.6 | 41.6 |
| % weight resin in dried film | 100 | 95 | 90 |
| % weight composite particles in dried film | 0 | 5 | 10 |

Each of the final dispersion was prepared by stirring for 2 min and allowing the final dispersion to stand overnight to degas.

The final dispersions were cast on 2 mil thick polyester (Mylar) using #30 Wire Wound Rod to achieve an approximately 1 mil dry film thickness. The wet coatings were dried at 120° C. for 40 min in a conventional oven. The films were removed from the oven and allowed to cool to room temperature. The sheets were conditioned at room temperature for at least 24 hours prior to testing.

Following conditioning, samples were tested with stainless steel substrates using the AR-1000 Peel Adhesion/Release Tester and S—OSI-8 Integrated 8 Bank Shear Tester and Oven, both from Cheminstruments International, according to the manufacturer's instructions. Two to four samples were prepared for each trial; the mean of each trial is reported in Tables 2B and 2C.

TABLE 2B

| Formulation | % weight composite particles in dry adhesive film | Shear temperature (C.) | Shear pressure (pounds per square inch) | Trial number | Shear time normalized to shear time for formulation 15A at listed test temperature |
|---|---|---|---|---|---|
| 15A | 0 | Ambient room temperature | 4.4* | 1 | 1.00 |
| 15B | 5 | Ambient room temperature | 4.4* | 1 | 4.47 |
| 15B | 5 | Ambient room temperature | 4.4* | 2 | 3.99 |
| 15C | 10 | Ambient room temperature | 4.4* | 1 | 6.16 |
| 15C | 10 | Ambient room temperature | 4.4* | 2 | 5.64 |
| 15A | 0 | 70 | 2.2# | 1 | 1.00 |
| 15B | 5 | 70 | 2.2# | 1 | 4.14 |
| 15C | 10 | 70 | 2.2# | 1 | 5.90 |
| 15A | 0 | 120 | 2.2# | 1 | 1.00 |
| 15B | 5 | 120 | 2.2# | 1 | 2.84 |
| 15C | 10 | 120 | 2.2# | 1 | 3.02 |

*shear pressure imparted over 1.0" × 0.5" area on stainless steel with 1.00 kg weight
shear pressure imparted over 1.0" × 1.0" area on stainless steel with 1.00 kg weight

TABLE 2C

| Formulation | % weight composite particles in dry adhesive film | Peel temperature (C.) | Peel force/peel force formulation 15A |
|---|---|---|---|
| 15A | 0 | Ambient room temperature | 1.00 |
| 15B | 5 | Ambient room temperature | 0.74 |
| 15C | 10 | Ambient room temperature | 0.81 |

The shear force results are illustrated graphically in FIG. 20. As is apparent from the results depicted in FIG. 20, the presence of the inventive composite particles increased the shear strength of the adhesive at every test temperature and every test shear.

Example 16

This example demonstrates use of the inventive composite particles in waterborne alkyd dispersions, in accordance with an embodiment of the invention.

Seven waterborne alkyd dispersions were prepared. All of the dispersions contained the components set forth in Table 3.

TABLE 3

| Component | Amount | Function |
|---|---|---|
| Uradil AZ-760 | 50.96 g | Binder resin (alkyd) |
| Water | 3.10 g | Solvent |
| Dehydran 1293 | 0.3 g | Defoamer |
| Surfynol 104DPM | 0.4 | Surfactant |
| BYK 346 | 0.1 g | Wetting agent |
| Additol | 0.73 g | Dryer |
| Dipropylene glycol methyl ether | 1.05 g | Co-solvent |
| Propylene glycol n-butyl ether | 1.51 g | Co-solvent |

Dispersion 16A (control) did not further comprise any additive. Dispersions 16B-16D (invention) further comprised 1 wt. %, 2 wt. %, and 6 wt. % (with respect to the resin), respectively, of the composite particles of Example 12. Dispersions 16E-16G (comparative) further comprised 1 wt. %, 3 wt. %, and 6 wt. % (with respect to the resin), respectively, of Cab-O-Sperse 1012A fumed silica dispersion. The dispersions were prepared by combining the components and stirring the mixtures.

Dispersions 16A-16G were cast in two sequential applications onto substrates comprising cold rolled steel panels using a BYK bird applicator with a thickness of 3 wet mills each.

The coatings were dried at room temperature. The hardness development for each substrate was monitored using a Koenig pendulum hardness tester following the manufacturer's protocol. Measurements were obtained at time points of 1 h, 2.5 h, 4 h, 8 h, 24 h, and 7 days. The results are illustrated graphically in FIGS. 15A-15C.

FIG. 15A illustrates the hardness development of Dispersions 16B-16D from 1 h to 24 h. Dispersion 16D, which contained 6 wt. % of the inventive composite particle, exhibited a hardness of approximately 31 at 24 h. Dispersions 16B and 16C, which contained 1 wt % and 2 wt. %, respectively, of the inventive composite particle, exhibited hardnesses of approximately 19 and 21, respectively, at 24 h.

FIG. 15B illustrates the hardness development of Dispersions 16E-16G from 1 h to 24 h. Dispersion 16E, which contained 6 wt. % of fumed silica, exhibited a hardness of approximately 23 at 24 h. Dispersions 16F and 16G, which contained 1 wt. % and 2 wt. %, respectively, of fumed silica, exhibited hardnesses of approximately 16 and 18, respectively, at 24 h.

FIG. 15C compares the hardness development of Dispersion 16D, which contained 6 wt. % of the inventive composite particle, Dispersion 16F, which contained 6 wt. % of fumed silica, and the control Dispersion 16A. Dispersion 16D (invention) exhibited a hardness of approximately 31 after 24 h. Dispersions 16F (comparative) and 16A (control) exhibited hardnesses of approximately 23 and 19, respectively, after 24 h.

Haze (20°) and gloss (60°) of the coatings were measured using a hazemeter (catalog number 4601) from BYK-Gardner GmbH. FIG. 19A illustrates the 60° gloss exhibited by substrates coated with Dispersions 16A-16F. FIG. 19B illustrates the 20° haze exhibited by substrates coated with Dispersions 16A-16F. Inventive Dispersions 16B-16D exhibited higher gloss and lower haze than did comparative Dispersions 16E-16F.

Example 17

This example demonstrates use of the inventive composite particles in epoxy adhesive formulations, in accordance with an embodiment of the invention.

Eleven two-component epoxy adhesive formulations were prepared. Each of the formulations contained the components set forth in Table 4.

TABLE 4

| Component | Supplier | Description |
|---|---|---|
| EPON ® 828 | Momentive | Bis A epoxy resin |
| EPON ® 58005 | Momentive | Adduct of CTBN with Bis A epoxy resin; 40% |
| Silica Masterbatch | Cabot Corp. | CAB-O-SIL ® TS-720 treated fumed silica (14 wt %) in EPON 828 |
| JEFFAMINE ® D-230 | Huntsman | Polyether amine |

CTBN = carboxyl terminated butadiene acrylonitrile

Formulations 17A-C (control) did not contain composite particles. Formulations 17D-17G (invention) further contained the composite particles of Example 11. Formulations 18H-18K (invention) further contained the composite particles of Example 13. The formulations are set forth in Tables 5 and 6.

TABLE 5

| | Formulation | | |
|---|---|---|---|
| Component | 17A | 17B | 17C |
| EPON ® 828 | 74% | 71% | 67% |
| EPON ® 58005 | 0% | 5% | 10% |
| Silica Masterbatch | 2% | 2% | 2% |
| JEFFAMINE ® D-230 | 24% | 22% | 21% |

TABLE 6

| | Formulation | | | | | | | |
|---|---|---|---|---|---|---|---|---|
| Component | 17D | 17E | 17F | 17G | 17H | 17I | 17J | 17K |
| EPON ® 828 | 70% | 67% | 67% | 63% | 70% | 67% | 67% | 63% |
| EPON ® 58005 | 0% | 0% | 5% | 5% | 0% | 0% | 5% | 5% |
| Silica Masterbatch | 2% | 2% | 2% | 2% | 2% | 2% | 2% | 2% |
| JEFFAMINE ® D-230 | 23% | 21% | 21% | 20% | 23% | 21% | 21% | 20% |
| Composite particle of Example 11 | 5% | 10% | 5% | 10% | | | | |

TABLE 6-continued

| Component | Formulation | | | | | | | |
|---|---|---|---|---|---|---|---|---|
| | 17D | 17E | 17F | 17G | 17H | 17I | 17J | 17K |
| Composite particle of Example 13 | | | | | 5% | 10% | 5% | 10% |

The adhesive formulations were prepared as follows. Silica masterbatch was prepared by adding silica to Epon 828 in a PP300 speedmixer cup. Wet-in and incorporation were carried out at 1500 rpm for 30 sec without drawing vacuum on a DAC600 speedmixer from FlackTek. Once the silica was wet in, grinding was done in 3 sets at 2300 rpm of 5 minutes each at the 100% vacuum setting on a DAC600 speedmixer. The letback was performed by mixing the Epon resins with silica masterbatch at 1500 rpm for 3 min at the 100% vacuum setting. Composite particles (Formulations 17D-17K) were added and mixed using a wooden tongue depressor. Jeffamine polyether amine was added and mixed at 1500 rpm for 3 min at the 100% vacuum setting then held for 1.5 min at the 100% vacuum setting without mixing (i.e., 0 rpm).

Metal substrates were prepared as described in Example 18. After application of silane and drying, the epoxy formulations were applied, all samples were pre-cured at 80° C. for 2 hours, and post-cured at 20° C. for 3 hours.

T-peel was determined according to ASTM D1876-08. Fracture toughness was determined by measuring tensile strength according to ASTM D638 and performing the single edged notched bending test according to ASTM D5045; the results of these tests are combined to calculate $K_{IC}$. The results are depicted graphically in FIGS. 16A-16D.

FIGS. 16A and 16B illustrate that the presence of 5 wt % and 10 wt. % of CTBN rubber toughener (provided by EPON® 58005) increases the T-peel strength and fracture toughness of the epoxy adhesive. FIG. 16C illustrates that the presence of the composite particle of Example 11 (dark gray) and of the composite particle of Example 13 (light gray) did not appreciably increase the T-peel strength of epoxy adhesive not containing CTBN rubber toughener. FIG. 16D illustrates that the presence of the composite particle of Example 11 (dark gray) and of the composite particle of Example 13 (light gray) significantly increases the T-peel strength of epoxy adhesive containing CTBN rubber toughener as compared with the control formulation not containing the inventive composite particles.

Example 18

This example demonstrates use of the inventive composite particles in polyurethane adhesive formulations, in accordance with an embodiment of the invention.

Seven polyurethane adhesive formulations were prepared. Each of the formulations contained the components set forth in Table 7.

TABLE 7

| Component name | Supplier | Description |
|---|---|---|
| Voranol 220-094 | Dow Chemical | Propylene glycol initiated, 1200 molecular weight homopolymer diol |
| Voranol 220-260 | Dow Chemical | Polyether polyol is a nominal 425 molecular weight homopolymer diol |
| Ultrabond 5760 | Cabot Corp. | Fumed silica |
| L Paste | UOP | Moisture scavenger |
| Suprasec 5025 | Huntsman Polyurethanes | Isocyanate |
| DBTDL catalyst | Sigma Aldrich | Dibutyltin dilaurate |

Formulation 18A (control) did not contain composite particles. Formulations 18B-18D (invention) further contained the composite particles of Example 11. Formulations 18E-18G (invention) further contained the composite particles of Example 13. The formulations are set forth in Table 8.

TABLE 8

| Component | Formulation | | | | | | |
|---|---|---|---|---|---|---|---|
| | 18A | 18B | 18C | 18D | 18E | 18F | 18G |
| Voranol 220-094 | 23.67% | 23.19% | 22.48% | 21.30% | 23.19% | 22.48% | 21.30% |
| Voranol 220-260 | 35.50% | 34.79% | 33.73% | 31.95% | 34.79% | 33.73% | 31.95% |
| Ultrabond 5760 | 5.92% | 5.80% | 5.62% | 5.33% | 5.80% | 5.62% | 5.33% |
| L Paste | 5.92% | 5.80% | 5.62% | 5.33% | 5.80% | 5.62% | 5.33% |
| Suprasec 5025 | 28.99% | 28.41% | 27.54% | 26.09% | 28.41% | 27.54% | 26.09% |
| DBTDL catalyst | 0.01% | 0.01% | 0.01% | 0.01% | 0.01% | 0.01% | 0.01% |
| Composite particle of Example 11 | — | 2.00% | 5.00% | 10.00% | — | — | — |
| Composite particle of Example 13 | — | — | — | — | 2.00% | 5.00% | 10.00% |

Sample preparation was performed in a nitrogen filled glove box. The Voranol products were weighed into a Max 300 long speedmixer cup with 8 yttrium beads (15 mm diameter from Flacktek). Silica was dried overnight at 200° C. and then the silica and, for the inventive formulations, the composite particles, were weighed and added to the cup. The mixture was ground on a DAC600 for 30 sec at 1500 rpm, 2 min at 1000 rpm, and 5 min at 800 rpm for 7 min 30 sec total time. The cup was returned to the glove box and material was scraped from the sides of the cup to collect it in the bottom of the cup. L Paste and Suprasec 5025 were weighed into the cup. A vacuum cap was placed on the cup and the mixture was mixed at 1000 rpm for 5 min under full vacuum on the DAC600. The cup was returned to the glove box and material scraped from the sides of the cup. The catalyst was weighed into the cup. The vacuum cap was placed on the cup and the mixture was mixed at 1000 rpm for 5 min at full vacuum on the DAC600 to provide the formulations.

Metal substrates cleaned by soaking in warm Palmolive solution in water, scrubbing using an orbital scrubber with a green Scotchbrite pad, soaking in warm Alconox solution in water, wiping with a green Scotchbrite pad, rinsing with cold tap water and then deionized water, and drying for 2-12 hours.

The cleaned metal substrates were prepared for sample application by sanding with an orbital sander, rinsing with acetone, applying drops of a silane (1 drop for Lap shear, 5 drops for T-peel for each bar), wiping the silane with a small paint brush to cover the entire bonding area, and then allowing the substrates to sit in the hood overnight.

After Lap Shear and T-peel sample application, the samples were pre-cured at room temperature in the hood for 3 hours, and then post-cured at 95° C. for 2 hours.

Lap shear was determined according to ASTM D1002-05. T-peel was determined according to ASTM D1876-08. The results are depicted graphically in FIGS. 17A-17D.

FIGS. 17A and 17B illustrate the effect on lap shear strength provided by the composite particles of Examples 11 and 13, respectively, as compared with control formulation 18A, which did not contain the inventive composite particles. FIG. 17A shows the lap shear strength exhibited by formulations 18A-18D, and FIG. 17B shows the lap shear strength exhibited by formulations 18A and 18E-18G.

FIGS. 17C and 17D illustrate the effect on T-peel strength provided by the composite particles of Examples 11 and 13, respectively, as compared with control formulation 18A, which did not contain the inventive composite particles. FIG. 17C shows the T-peel strength exhibited by formulations 18A-18D, and FIG. 17D shows the T-peel strength exhibited by formulations 18A and 18E-18G.

Example 19

This example demonstrates the preparation of composite particles, in accordance with an embodiment of the invention.

A commercial carnauba wax dispersion (50 g, Aquaslip 952 dispersion, 20 wt % wax, Lubrizol) was diluted with 150 g deionized (DI) water to 5 wt % dispersion. Vinyltrimethoxysilane (10 g) was dissolved in 50 g deionized water and stirred with a magnetic stir bar (300 rpm) for 60 min until the organic droplets were completely dissolved and a transparent solution was obtained. Ammonium hydroxide (4 g of 30 wt % aqueous solution) was added to the diluted wax dispersion and mixed under mechanical stirring for 5 min to bring the pH to about 11. The vinyltrimethoxysilane solution was added over 1 minute. The reaction was allowed to proceed for 5 hours at room temperature. The pH was measured before and after addition of the organosilane compound.

The wax emulsion was diafiltered to remove excess reagent and surfactant and to increase the volume fraction of composite particles. A peristaltic pump was used to flow water through a cartridge from GE Healthcare (product number UFP-500-E-4MA) with a 500,000 molecular weight cut-off, a 1 mm inner tube diameter, and a flow pressure kept constantly under 5 psi. The concentration of the emulsion was increased to about 20 wt %, and then distilled water was continually added to replace the surfactant-filled water that was being removed. To ensure full purification 1.5 liters of distilled water was used for this.

The average particle size measured by the Microtrac Nanotrac™ 252 analyzer was 128 nm, in comparison to 106 nm for the as-received dispersion. TEM of the composite particles showed organosilica particles disposed at the surface of the wax particles.

Example 20

This example demonstrates the preparation of a toner in accordance with an embodiment of the invention.

The composite particle dispersion of Example 19 was brought to a concentration of about 20 wt %. A mixture with 4 g of the particle dispersion, 40 g of dry toner, and 70 g deionized water was prepared. The mixture was sonicated in a bath sonicator for 1 hour to obtain a well-mixed dispersion. The sonicated mixture was vortexed for 5 min. at the highest speed on the Vortex Genie 2 vortex mixer from Scientific Instruments. The dispersion was poured into an approximately 2 L Pyrex glass pan and well spread to form a thin layer in the bottom of the pan. The material was allowed to dry at ambient temperature (about 23° C.) in a fume hood under about 80 ft/min of ventilation for 48 hours, until the moisture content was less than about 2 wt %. FIG. 14 demonstrates that the composite wax particles stick well to the toner surface.

Example 21

This example demonstrates the attempted preparation of a composite particle using tetraethylorthosilicate ("TEOS") in place of an organosilane compound.

A polyester dispersion was prepared using the procedure of Example 1 with 38 g of polyester containing 26.4% solid in water and methacryloxypropylsilane. The dispersion was diluted with 162 g of deionized water. To the diluted dispersion was added 1 g of 30% ammonia. The pH of the mixture was about 10.2 The dispersion was mixed at 300 rpm with an overhead mixer for 5 min.

15 g of TEOS was added dropwise over 15-20 min while stirring. After the TEOS addition was complete, the mixture was further stirred at room temperature overnight.

After stirring overnight, a large mass of white solid was floating in the mixture. A TEM image of a sample of the liquid phase is depicted in FIG. 18. The image indicates that organosilica was not formed on the polyester particles.

Example 22

Composite particles produced according to Example 6 (30 g) were added to a 1 L HDPE Thermo Scientific™ Nalgene™ bottle. Hexamethyldisilazane (total 3.3 g) was applied to the powder in several additions using a commercially available spray bottle. The bottle was sealed and shaken between each addition to ensure mixing of treating agent and particles, as well as to release any accumulated pressure. The bottle and its contents were sealed then agitated on a two-roll mill for approximately 4 hours. The reaction of HMDZ with the composite particles was confirmed by the presence of an exotherm and a buildup of pressure when spraying the silazane compound. After the reaction, the contents of the bottle were transferred to a Pyrex crystallizing dish and dried in vacuo at 150° C., with nitrogen purge, for 2 hours. The resulting off-white powder was allowed to cool overnight under vacuum with nitrogen purge.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Composite particles comprising core particles having organosilica particles disposed about the core particles, the core particles comprising an organic material and the organosilica particles having a molar ratio of C to Si of 0.5 or greater and being derived via reaction of an organosilane compound having the formula $R^1SiR^2_3$, wherein $R^1$ is $C_1$-$C_4$ alkyl or $C_2$-$C_4$ alkenyl, wherein $R^2$ is alkoxy, chloro, bromo, or iodo, wherein the composite particles have a roundness R of from 1.1 to 2.0, wherein the roundness is determined by the formula: $R=P^2/(4\pi S)$ wherein P is the perimeter of a cross-section of the composite particle and wherein S is the cross-sectional area of the composite particle as measured on over 500 particles observed by transmission electron microscopy performed at 80 kV.

2. The composite particles of claim 1, wherein the organic material further comprises a polymerized ethylenically unsaturated monomer.

3. A toner composition comprising toner particles mixed with the composite particles of claim 1.

4. A structural adhesive comprising the composite particles of claim 1.

5. A pressure-sensitive adhesive comprising the composite particles of claim 1.

6. A coating composition comprising the composite particles of claim 1.

7. A thermoset polymer comprising the composite particles of claim 1.

8. A thermoplastic polymer comprising the composite particles of claim 1.

9. The composite particles of claim 1, further comprising metal particles or metal oxide particles disposed within the core particles.

10. The composite particles of claim 1, wherein the organosilica particles are derived via reaction of the organosilane compound and up to 50 molar percent of a tetraalkoxyorthosilicate.

11. The composite particles of claim 1, wherein the composite particles have a particle size d50 as determined by dynamic light scattering of 30 to 302 nm.

12. A process for preparing composite particles comprising core particles having organosilica particles disposed about the core particles, comprising the steps of:
    (a) providing an aqueous dispersion comprising polymer or wax particles and a surface agent, the aqueous dispersion having a pH of 8 or more,
    (b) adding an aqueous mixture comprising an at least partially hydrolyzed organosilane compound to the aqueous dispersion to form a mixture, wherein the organosilane compound has a formula: $R^1SiR^2_3$, wherein $R^1$ is $C_1$-$C_4$ alkyl, $C_2$-$C_4$ alkenyl, or $C_2$-$C_4$ alkynyl and wherein $R^2$ is alkoxy, chloro, bromo, or iodo, and
    (c) forming the aqueous dispersion of composite particles via production of organosilica particles by a reaction of the at least partially hydrolyzed organosilane compound, wherein the organosilica particles have a molar ratio of C to Si of 0.5 or greater,
    wherein the composite particles have a roundness R of from 1.1 to 2.0, wherein the roundness is determined by the formula: $R=P^2/(4\pi S)$ wherein P is the perimeter of a cross-section of the composite particle and wherein S is the cross-sectional area of the composite particle as measured on over 500 particles observed by transmission electron microscopy performed at 80 kV.

13. The method of claim 12, wherein providing comprises A) combining an aqueous dispersion of polymer particles with an ethylenically unsaturated monomer, allowing the monomer to migrate into the polymer particles, and polymerizing the monomer, or B) dissolving a polymer in solvent, adding water to form an oil in water emulsion, and distilling the solvent from the emulsion to form an aqueous dispersion of polymer particles.

14. The method of claim 13, wherein dissolving comprises A) dissolving the polymer and an ethylenically unsaturated monomer in the solvent, B) dissolving comprises dissolving the polymer and the surface agent in the solvent, or both.

15. The method of claim 13, further comprising adding the surface agent to the aqueous dispersion after distilling the solvent.

16. The method of claim 13, further comprising, after distilling, adding an ethylenically unsaturated monomer to the emulsion, allowing the monomer to migrate into the polymer particles, and polymerizing the monomer.

17. The process of claim 12, wherein the surface agent comprises a polyethylene glycol-based polymer, quaternary amine-based organic compound, polyvinylpyrrolidone- or polypyrrolidone-based surfactant, or an anionic surfactant with a sulfate anionic component.

18. The process of claim 12, wherein the surface agent comprises $SiH_{3-x}R^3_xR^4Q$, where x is 1, 2, or 3, $R^3$ is alkoxy, chloro, bromo, or iodo, $R^4$ is $C_3$-$C_{22}$ branched or unbranched alkylene or alkenylene or aromatic group and optionally includes an ether, ester, or amine linkage, and Q is H, Cl, Br, F, hydroxyl, carboxylic acid, epoxy, amine, or a substituted or unsubstituted vinyl, acrylate, or methacrylate.

19. The process of claim 12, further comprising a step (e) of treating the composite particles with a hydrophobizing agent, a step (f) of drying the aqueous dispersion, or both.

* * * * *